(12) United States Patent
Li et al.

(10) Patent No.: US 12,031,677 B2
(45) Date of Patent: Jul. 9, 2024

(54) SYSTEM AND METHOD WITH BOIL-OFF MANAGEMENT FOR LIQUEFIED GAS STORAGE

(71) Applicants: China Energy Investment Corporation Limited, Beijing (CN); National Institute of Clean-and-Low-Carbon Energy, Beijing (CN)

(72) Inventors: Xianming Li, Orefield, PA (US); Anthony Ku, Fremont, CA (US); Jerad Allen Stager, Richmond, CA (US); Ashwin Ramteke, Santa Clara, CA (US)

(73) Assignees: China Energy Investment Corporation Limited, Beijing (CN); National Institute of Clean-and-Low-Carbon Energy, Beijing (CN)

( * ) Notice: Subject to any disclaimer, the term of this patent is extended or adjusted under 35 U.S.C. 154(b) by 384 days.

(21) Appl. No.: 17/371,370

(22) Filed: Jul. 9, 2021

(65) Prior Publication Data
US 2023/0015757 A1 Jan. 19, 2023

(51) Int. Cl.
*F17C 13/04* (2006.01)
*F02M 21/02* (2006.01)

(52) U.S. Cl.
CPC .............. *F17C 13/04* (2013.01); *F02M 21/02* (2013.01); *F17C 2221/012* (2013.01);
(Continued)

(58) Field of Classification Search
CPC ................ F17C 13/04; F17C 2221/012; F17C 2223/013; F17C 2227/0135;
(Continued)

(56) References Cited

U.S. PATENT DOCUMENTS

| 6,802,875 B1 * | 10/2004 | Kimbara ............ C01B 3/26 48/85.1 |
| 2006/0005895 A1 | 1/2006 | Gram et al. |

(Continued)

FOREIGN PATENT DOCUMENTS

| CN | 111465264 A | 7/2020 |
| CN | 112344207 A | 2/2021 |

OTHER PUBLICATIONS

Joakim Andersson et al., Large-scale storage of hydrogen, International Journal Of Hydrogen Energy 44 (2019) 11901-11919, https://doi.org/10.1016/j.'hydene.2019.03.063.
(Continued)

*Primary Examiner* — Christopher R Zerphey
*Assistant Examiner* — Ibrahim A. Michael Adeniji
(74) *Attorney, Agent, or Firm* — Calfee, Halter & Griswold LLP

(57) ABSTRACT

A system and a method with boil-off management for liquefied fuel storage are provided. The system includes a cryotank for storing a liquefied fuel, a pump for providing and compressing a first stream of the liquefied fuel, a heat exchanger for provide cooling duty to the first stream of the liquefied fuel, and an expansion valve for expanding the first stream of the liquefied fuel after the heat exchanger into a multiphase stream comprising a liquid phase and a gas phase. The multiphase stream has a temperature lower than an initial temperature of the first stream from the cryotank. The system further comprises a liquid-vapor splitter for separating the liquid phase and gas phase in the multiphase stream. The liquid phase is returned into the cryotank.

22 Claims, 14 Drawing Sheets

(52) U.S. Cl.
CPC ............... F17C 2223/013 (2013.01); F17C 2223/0161 (2013.01); F17C 2227/0135 (2013.01); F17C 2227/0142 (2013.01); F17C 2227/036 (2013.01); F17C 2250/0626 (2013.01); F17C 2265/03 (2013.01); F17C 2265/033 (2013.01); F17C 2265/038 (2013.01); F17C 2270/0184 (2013.01)

(58) Field of Classification Search
CPC ........ F17C 2227/036; F17C 2250/0626; F17C 2265/033; F17C 2265/038; F17C 2270/0184; F17C 2223/0161; F17C 2223/033; F17C 2225/0115; F17C 2225/035; F17C 2227/0142; F17C 2227/0178; F17C 2227/0353; F17C 2260/035; F17C 2265/03; F17C 7/04; F17C 13/00; F02M 21/02; Y02E 60/32
See application file for complete search history.

(56) References Cited

U.S. PATENT DOCUMENTS

| | | | | |
|---|---|---|---|---|
| 2015/0068222 | A1* | 3/2015 | Hakamada | F17C 13/00 62/53.2 |
| 2017/0059091 | A1* | 3/2017 | Tafreshi | F25J 1/0035 |
| 2019/0331298 | A1* | 10/2019 | Thor | F17C 5/02 |
| 2020/0055730 | A1* | 2/2020 | Lugtigheid | C01B 3/065 |
| 2020/0158288 | A1* | 5/2020 | Li | F17C 7/04 |
| 2023/0272884 | A1* | 8/2023 | Sharma | F17C 13/00 62/50.3 |

OTHER PUBLICATIONS

W.U. Notardonato et al., Zero boil-off methods for large-scale liquid hydrogen tanks using integrated refrigeration and storage, IOP Conference Series: Materials Science and Engineering, vol. 278, No. 1, IOP Publishing, 2017, https://iopscience.iop.org/article/10.1088/1757-899X/278/1/012012/meta.

Deborah R. Zakar et al., Zero-Boil-Off Cryogen Storage Cryogenic Loop Heat Pipe for use in Unmanned Air Vehicles, AIAA Propulsion and Energy Forum, Jul. 10-12, 2017, Atlanta, GA, 15th International Energy Conversion Engineering Conference, 2017, https://arc.aiaa.org/doi/10.2514/6.2017-4696.

Shuvo Mustafi, et al., Subcooling Cryogenic Propellants for Long Duration Space Exploration, American Institute of Aeronautics and Astronautics, in Aiaa Space 2009 Conference & Exposition (p. 6584). https://ntrs.nasa.gov/api/citations/20180000059/downloads/20180000059.pdf.

Eric W. Lemmon et al., REFPROP Documentation Release 10.0, National Institute of Standards and Technology (NIST), Jun. 4, 2018.

* cited by examiner

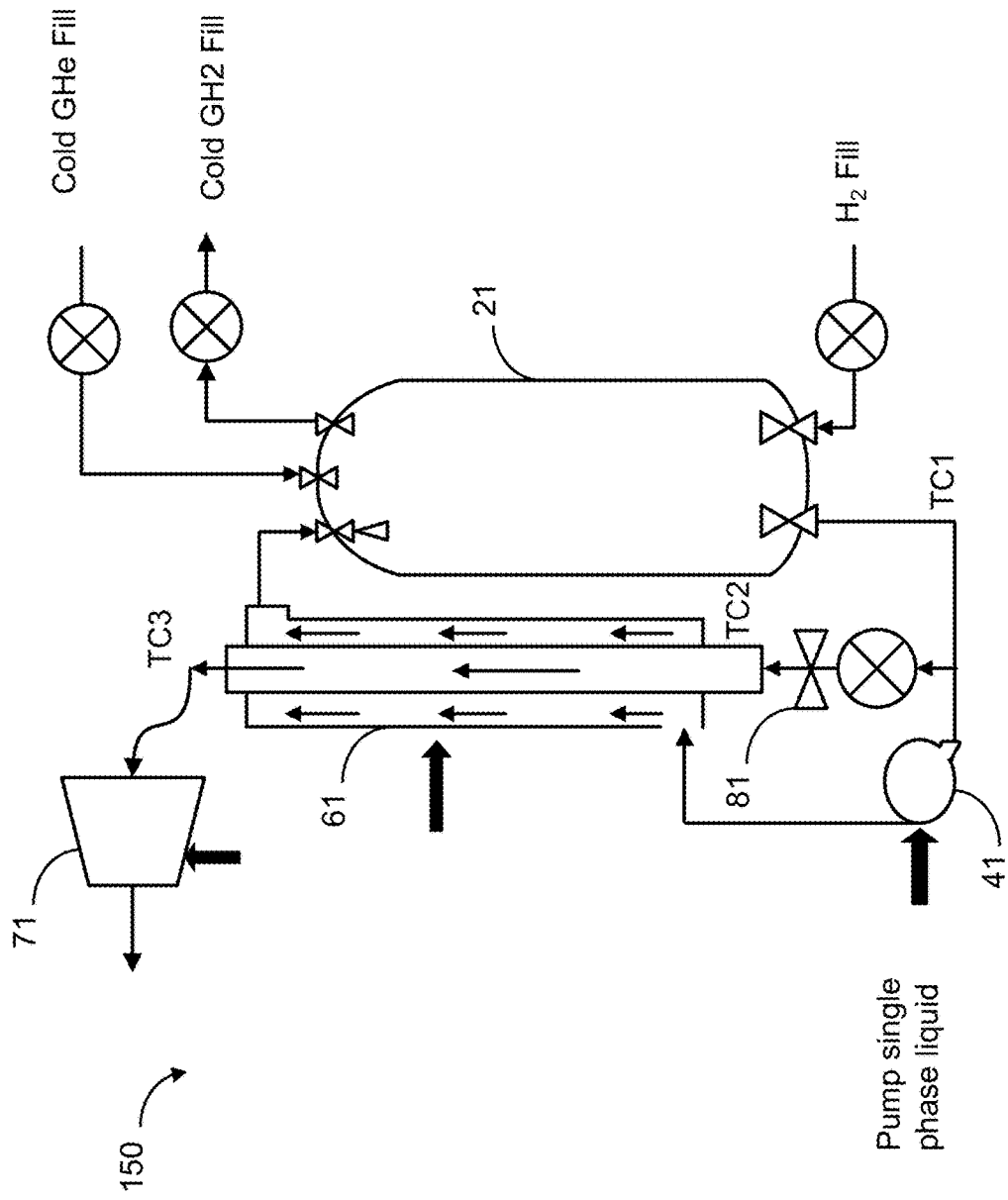

SYSTEM AND METHOD WITH BOIL-OFF MANAGEMENT FOR LIQUEFIED GAS STORAGE

PRIORITY CLAIM AND CROSS-REFERENCE

None.

FIELD OF THE INVENTION

The disclosure relates to methods and systems for storing, transferring or dispensing a liquefied gas or fuel generally. More particularly, the disclosed subject matter relates to a system and a method for storing and/or refueling hydrogen.

BACKGROUND

Many motor vehicles are currently powered by internal combustion engines with fossil fuels. Due to limited supply and adverse environmental effects associated with burning petroleum-derived fuels, vehicles are now being developed that are powered by alternative environmentally friendly fuels like hydrogen. Fuel cells can be used to produce electric power for motor vehicles by electrochemically reacting hydrogen fuel with an oxidant such as air. Other hydrogen-powered vehicles can be powered by combustion of hydrogen. Fueling or refueling hydrogen to fuel cell vehicles (FCV) and other hydrogen-powered vehicles presents different challenges from adding petroleum-based fuels like gasoline into a vehicle.

Hydrogen refueling stations for fuel cell vehicles can store fuel as a gas or a liquid before it is dispensed to vehicles as compressed gaseous hydrogen. Liquefied gases or fuels such as liquid hydrogen can be stored in a cryogenic tank, which is thermally insulated from environment. However, heat leak into the tank causes liquefied gas to vaporize to generate "boil-off" vapor as the liquid absorbs the heat leak from the environment. Pressure inside the tank increases as the vapor continues to build up in it. Excess vapor must be vented through a relief valve to the environment to keep the tank under the pressure limit, causing loss of some liquefied fuel or gas. A system with minimal or zero boil-off is needed.

SUMMARY OF THE INVENTION

The present disclosure provides a system and a method with boil-off management for storage of a liquefied gas or fuel. For example, the liquefied fuel comprises or is hydrogen, and the system is a system for storing and/or using liquid hydrogen.

In accordance with some embodiments, a system comprises a cryotank configured to store a liquefied fuel therein, a pump fluidly coupled with the cryotank, a heat exchanger coupled with the pump, an expansion valve, and a liquid-vapor splitter fluidly coupled to the expansion valve. The pump is configured to provide or pump a first stream of the liquefied fuel from the cryotank while compressing the first stream of the liquefied fuel to an increased pressure. The heat exchanger is configured to provide cooling duty to the first stream of the liquefied fuel from the pump. The expansion valve is configured to expand the first stream of the liquefied fuel from the heat exchanger into a multiphase stream comprising a liquid phase and a gas phase. The multiphase stream has a temperature lower than that of an initial temperature of the first stream from the cryotank. The liquid-vapor splitter is fluidly coupled to the expansion valve and is configured to separate the liquid phase and the gas phase in the multiphase stream. The liquid phase is configured to be returned into the cryotank.

In some embodiments, the liquefied fuel comprises or is hydrogen. The pump comprises one or more submerged liquid pumps, which are disposed inside the cryotank and configured to compress and increase pressure of the first stream of the liquefied fuel to be pumped out.

In some embodiments, the system further comprises an expander turbine, which is coupled with the heat exchanger and the expansion valve. The expander turbine is configured to expand the first stream of the liquefied fuel from the heat exchanger isentropically.

The expansion valve is a Joule-Thomson (J-T) valve in some embodiments. The system may further comprise an interlock chamber, which is fluidly coupled to the cryotank and is configured to return the liquid phase into the cryotank. The liquid phase may be mixed with the liquefied fuel or sprayed into the headspace of the cryotank. A vapor phase may exist in the headspace.

In some embodiments, the liquid-vapor splitter is configured to provide the gas phase to the heat exchanger for providing additional cooling duty to the first stream of the liquefied fuel from the pump. In addition, the cryotank may be configured to provide a vapor phase of the liquefied fuel from the headspace of the cryotank to the heat exchanger for providing additional cooling duty to the first stream of the liquefied fuel from the pump. The system may further comprise at least one or both of a refrigeration unit coupled with the heat exchanger, and a backup power unit. The refrigeration unit is configured to receive the gas or vapor phase from the heat exchanger and provide cooling duty to a facility such as a data center. The backup power unit is configured to receive the gas or vapor phase from the heat exchanger and generate electrical power. The backup power unit comprises one or more fuel cells or combustion engines for power generation.

In some embodiments, the system may further comprise a refueling station comprising a dispenser. The refueling station is configured to receive a second stream of the liquefied fuel from the cryotank and dispense it in a form of a gaseous fuel or liquid fuel to a receiving fuel tank such as an onboard fuel tank for a vehicle.

In another aspect, the present disclosure provides a method. Such a method comprises steps of: providing a liquefied fuel stored inside a cryotank, and pumping a first stream of the liquefied fuel from the cryotank, while compressing the first stream of the liquefied fuel to an increased pressure, through a pump fluidly coupled with the cryotank. The method further comprises cooling the first stream of the liquefied fuel from the pump through a heat exchanger, which may be coupled with a lower temperature gas stream from the system (either headspace gas, or the vapor phase gas after the splitter), and expanding the first stream of the liquefied fuel from the heat exchanger into a multiphase stream through an expansion valve. The cooling process may be substantially isobaric. The multiphase stream comprises a liquid phase and a gas phase, and has a temperature lower than that of an initial temperature of the first stream from the cryotank. The method further comprises separating the liquid phase and the gas phase in the multiphase stream through a liquid-vapor splitter fluidly coupled to the expansion valve, and returning the liquid phase from the liquid-vapor splitter into the cryotank.

In some embodiments, the liquefied fuel comprises or is hydrogen. The pump comprises one or more submerged liquid pumps disposed inside the cryotank. The method may further comprise expanding the first stream of the liquefied fuel from the heat exchanger isentropically, through an expander turbine coupled with the heat exchanger and the expansion valve. An expansion valve is a Joule-Thomson valve in some embodiments.

In some embodiments, the liquid phase is returned into the cryotank through an interlock chamber fluidly coupled to the cryotank. The liquid phase is fed into the liquid phase in the cryotank, or can be sprayed into a vapor phase in the headspace of the cryotank in a top-fill process.

In some embodiments, the method further comprises providing the gas phase from the liquid-vapor splitter to the heat exchanger for providing additional cooling duty to the first stream of the liquefied fuel from the pump. In addition, the method may further comprise providing a vapor phase of the liquefied fuel from a headspace of the cryotank to the heat exchanger for providing additional cooling duty to the first stream of the liquefied fuel from the pump. The method may also further comprise at least one or both of: providing cooling capacity from a refrigeration unit coupled with the heat exchanger to a facility in need thereof, by using the gas or vapor phase from the heat exchanger, and generating electrical power in a backup power unit by using the gas or vapor phase from the heat exchanger. In some embodiments, the electrical power is generated through one or more fuel cells in the backup power unit. The electricity power from the backup power unit may be provided to a data center or the pump. The refrigeration unit provides cooling capacity to a facility or environment where cooling is needed, for example, the data center.

The method may further comprise providing a second stream of the liquefied fuel from the cryotank to a refueling station comprising a dispenser, and dispensing it in a form of a gaseous fuel or liquid fuel to a receiving fuel tank, for example, an onboard fuel tank in a vehicle.

The system and the method provided in the present disclosure provide many advantages as described herein. For example, in some embodiments, the present disclosure provides a system for hydrogen storage and refueling. The system in the present disclosure minimizes or eliminates losses of liquefied fuel such as hydrogen or has zero losses of hydrogen boil-off. The hydrogen gas or vapor from the liquefied fuel in the storage tank can also be used for providing backup power, for example, to a pump, and providing cooling capacity, for example, to a data center.

BRIEF DESCRIPTION OF THE DRAWINGS

The present disclosure is best understood from the following detailed description when read in conjunction with the accompanying drawings. It is emphasized that, according to common practice, the various features of the drawings are not necessarily to scale. On the contrary, the dimensions of the various features are arbitrarily expanded or reduced for clarity. Like reference numerals denote like features throughout specification and drawings.

FIG. 12 shows a thermodynamic cryogen subcooler (TCS) proposed for a launch pad subcooling system as reported in the prior art.

DETAILED DESCRIPTION

Figure 1:
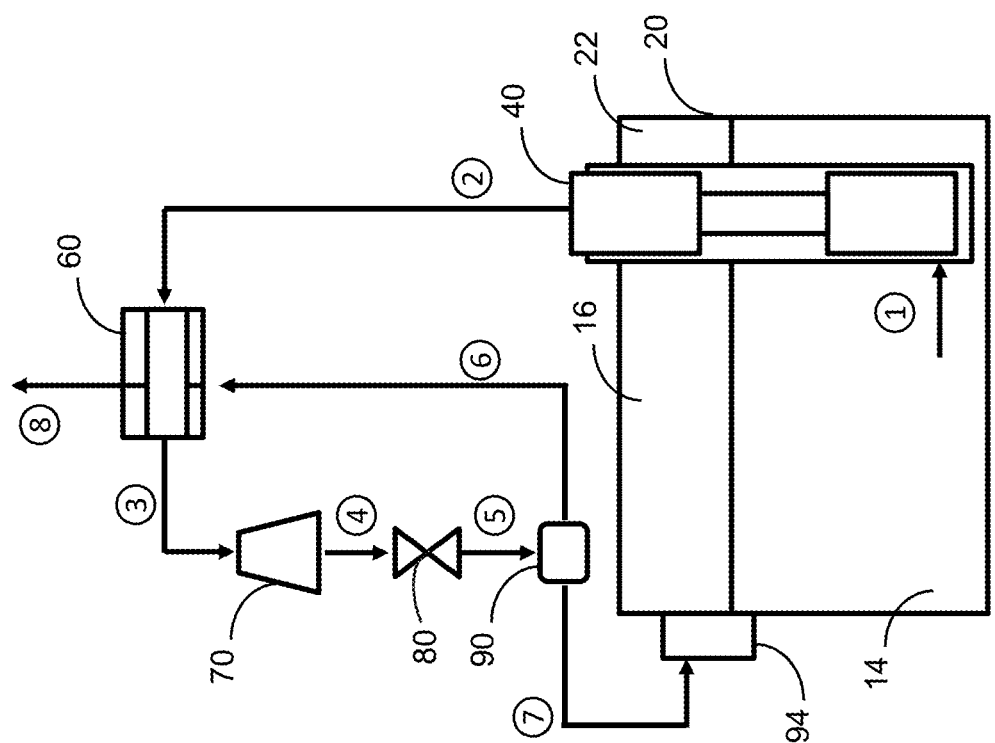
FIG. 1 is a block diagram illustrating a first exemplary system and flow paths of liquid, vapor and supercritical fluid in accordance with some embodiments.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

For purposes of the description hereinafter, it is to be understood that the embodiments described below may assume alternative variations and embodiments. It is also to be understood that the specific articles, compositions, and/or processes described herein are exemplary and should not be considered as limiting.

In the present disclosure the singular forms "a," "an," and "the" include the plural reference, and reference to a particular numerical value includes at least that particular value, unless the context clearly indicates otherwise. When values are expressed as approximations, by use of the antecedent "about," it will be understood that the particular value forms another embodiment. As used herein, "about X" (where X is a numerical value) preferably refers to ±10% of the recited value, inclusive. For example, the phrase "about 8" preferably refers to a value of 7.2 to 8.8, inclusive. Where present, all ranges are inclusive and combinable. For example, when a range of "1 to 5" is recited, the recited range should be construed as including ranges "1 to 4", "1 to 3", "1-2", "1-2 & 4-5", "1-3 & 5", "2-5", and the like. In addition, when a list of alternatives is positively provided, such listing can be interpreted to mean that any of the alternatives may be excluded, e.g., by a negative limitation in the claims. For example, when a range of "1 to 5" is recited, the recited range may be construed as including situations whereby any of 1, 2, 3, 4, or 5 are negatively excluded; thus, a recitation of "1 to 5" may be construed as "1 and 3-5, but not 2", or simply "wherein 2 is not included." It is intended that any component, element, attribute, or step that is positively recited herein may be explicitly excluded in the claims, whether such components, elements, attributes, or steps are listed as alternatives or whether they are recited in isolation.

Unless it is expressly stated otherwise, the term "substantially" such as in "substantially the same" used herein will be understood to encompass a parameter with a fluctuation in a suitable range, for example, with ±10% or ±15% fluctuation of the parameter. In some embodiments, the range of fluctuation is within ±10%.

Unless expressly indicated otherwise, a liquefied fuel such as hydrogen is stored in a storage tank, and pumped out using a pump in liquid form. It can be dispensed as a gaseous fuel or liquid fuel into a receiving tank in a vehicle. In the present disclosure, the terms "fueling" and "refueling" are used interchangeably.

As used herein, when an element or component is described as forming a "connected to," "coupled to," "coupled with" or "in contact with" another element or component, it can be directly connected to, directly coupled with, in direct contact with, or intervening elements or components may be connected, coupled or in contact with the particular element or component. When an element or component is referred to as being "directly connected to," "directly coupled to," "directly coupled with," or "directly in contact with" another element, there are no intervening elements or components.

As used herein, the terms "thermally coupled to" or "thermally coupled with" used herein will be understood that the components are coupled together directly or through an intervening component so that heat can be transferred among the components, and the components may be in direct contacted with each other or the intervening component contact the components. As used herein, the terms "fluidly coupled to" or "fluidly coupled with" used herein will be understood that the components are connected with pipes or lines and configured to have gas or liquid flow through the components. As used herein, the terms "electronically connected" or "electrically connected" used herein will be understood to encompass electrical connection using wires or wireless connection.

The term "ambient temperature" used herein will be understood as a temperature under ambient condition, for example, a room temperature of 20-22° C.

Liquefied gases or fuels such as liquid hydrogen are stored in cryogenic tanks. Heat leak into these tanks causes the liquid to vaporize, generating "boil-off" vapor and increasing the pressure of the headspace gas in the tank. Over time, a build-up of pressure in the tank leads to the need to vent gaseous hydrogen in the headspace to keep the cryotank under its pressure limit. As an alternative to venting, the boil-off problem can be solved by introducing cooling duty into the tank to offset the heat leak.

A goal for cryogenic liquid hydrogen storage is zero boil-off, which minimizes or eliminate losses of hydrogen as gas from the cryotank, resulting in improved operational efficiency.

Options for the large-scale storage of hydrogen are reviewed in J. Andersson, et al., "Large scale storage of hydrogen," *International Journal of Hydrogen Energy* 44 (2019): 11901-11919. The vented boil-off gas can be injected into a late stage of the liquefaction cycle to avoid its net loss from the system. However, the cryotank for storage must be in proximity to a large scale liquefaction facility, or measures must be taken to collect vented boil-off gas, and deliver it to the liquefaction system.

A system of integrated refrigeration and storage (IRAS) was used to remove energy from a liquid hydrogen tank and control the state of the propellant as described in W. U. Notardonato, et al., "Zero boil-off methods for large-scale liquid hydrogen tanks using integrated refrigeration and storage," *IOP Conference Series: Materials Science and Engineering*, 278 (1), 2017. Heat leak entering the tank is removed by a cryogenic refrigerator using helium with a heat exchanger inserted into the tank. One cryogenic refrigerator was a Linde LR1620 refrigerator, which is a Brayton cycle unit using a closed loop helium refrigeration system. However, the approach faces many challenges, for example, temperature and pressure control of the integrated system during zero-boil-off operation, challenges in the fabrication of cryotanks with embedded heat exchangers, and energy consumption of the helium cryocooler, including during cycling to match non-steady cooling duty requirements.

D. R. Zakar, et al. reported using a cryogenic loop heat pipe to remove an amount of the generated vapor out of the storage tank and transport it to a cryocooler where it is condensed back to liquid and returned to the tank. See D. R. Zakar, et at, "Zero-boil-off cryogen storage cryogenic loop heat pipe for use in unmanned air vehicles," 15th International Energy Conversion Engineering Conference, 2017. The heat pipe system requires a cryocooler to re-liquefy the vapor extracted from the tank headspace.

However, for a system using cryo-cooler, existing cryocoolers capable of supplying cooling duty at temperatures below 30K using expansion cycles are complex and require multiple stages. Alternative croycoolers based on magnetocaloric processes are still in the development stage and await materials and engineering breakthroughs for large scale operation. In addition, when a cryo-cooler is used, there are also limitations in the size of cryo-cooler systems. Multiple systems can be installed in parallel, but this presents a challenge to scalability due to complexity, energy use, and capital cost.

A concept of thermodynamic cryogen subcooler (TCS) was proposed for a launch pad subcooling system. See S. Mustafi, et al., (2009, September), "Subcooling cryogenic propellants for long duration space exploration," *AIAA SPACE* 2009 *Conference & Exposition* (2009). In a theoretical isobaric cooling process, liquid hydrogen is expanded isenthalpically through a Joule-Thomson valve to subcool liquid hydrogen circulated from the cryotank using a heat exchanger. No hydrogen from the expanded stream is returned to the tank.

However, in such TCS concept, the degree of cooling is limited by the starting pressure in the cryotank and the final pressure after expansion. The expanded hydrogen must be compressed for use outside the tank system. For example, a four stage compressor is needed. None of the expanded hydrogen is returned to the cryotank. This results in a potential reduction in pressure that must be offset by cold helium pressurant gas added in order to prevent collapse of the tank.

The possibility of compressing the liquid stream from the cryotank before isenthalpic expansion has not been considered.

The present disclosure provides a system and a method with boil-off management for storage of a liquefied gas or fuel. For example, the liquefied fuel comprises or is hydrogen, and the system is a system for storing and/or using liquid hydrogen.

In some embodiments, the present disclosure provides a boil-off management system that offsets at least a portion of the heat leak into a cryotank containing liquid hydrogen using a compression-expansion cycle to produce a stream of liquid hydrogen with a temperature below the temperature of liquid hydrogen in the tank. The compression-expansion cycle comprises: a stream of the liquid hydrogen extracted from a cryotank, a liquid hydrogen pump to compress the liquid stream, a heat exchanger to cool the compressed liquid hydrogen, an expander to produce saturated liquid hydrogen at a temperature lower than the initial liquid stream, and a return mechanism to deliver liquid hydrogen cooled to a temperature below that of the liquid hydrogen originally extracted from the cryotank. The system optionally comprises a power generation system that uses hydrogen to generate electricity, wherein the power generation system is powered by a portion of the boil-off gas and optionally provides electricity to operate the pump. The present disclosure also provides a system and a method for refueling while also providing backup power and cooling capacity. For example, the system is a hydrogen refueling station. Both the backup power and cooling capacity are supplied to a site or facility in need thereof such as a data center.

In FIGS. 1, 3, and 7-9, like items are indicated by like reference numerals, and for brevity, descriptions of the structure, provided above with reference to the preceding figures, are not repeated. FIGS. 2, 4, 5-6, and 10 show the T-S diagrams and properties of the examples associated with the systems illustrated in FIGS. 1, 3, and 7-9. The methods described in FIGS. 11A-11C are described with reference to the exemplary structure described in FIGS. 1, 3, and 7-9. In FIGS. 1, 3, and 7-9, the numbers in circles represent the fluid flow and different streams. A same stream at different stages may be labelled using different numbers.

Referring to FIG. 1, the exemplary system 100 comprises a cryotank 20, a pump 40, a heat exchanger 60, an expansion valve 80, and a liquid-vapor splitter 90. The system may further comprise an expander turbine 70.

The cryotank 20 is configured to store a liquefied fuel 14 therein. The cryotank 20 may be an insulated tank suitable for storing a liquefied fuel 12 such as liquid hydrogen at low temperature and under pressure. In some embodiments, the liquefied fuel 14 comprises or is hydrogen. The cryotank 20 may include a headspace 22, where a vapor phase 16 (boil-off) of the liquefied fuel 14 may exist.

The pump 40 is fluidly coupled with the cryotank 20, and configured to provide or pump a first stream 1 of the liquefied fuel 14 from the cryotank 20 while compressing the first stream 1 of the liquefied fuel 14 to an increased pressure. The pump 40 comprises one or more submerged liquid pumps, which are disposed inside the cryotank 20 and configured to compress and increase pressure of the stream of the liquefied fuel to be pumped out. The stream of the liquefied fuel discharged from the pump 40 (labelled as 2) may be in supercritical state.

The heat exchanger 60 is coupled with the pump 40, and is configured to provide cooling duty to the stream 2 of the liquefied fuel from the pump 40. The cooled stream is labelled as 3, and may be in a supercritical state.

The expander turbine 70 is coupled with the heat exchanger 60 and the expansion valve 80. The expander turbine 70 is configured to expand the stream 3 of the liquefied fuel from the heat exchanger 60 isentropically, while producing an outlet stream (labelled as 4) at a lower temperature.

The expansion valve 80 is configured to expand the stream of the liquefied fuel from the heat exchanger 60 or the expander turbine 70 into a multiphase stream 5, which comprises a liquid phase 7 and a gas phase 6. The expansion valve is a Joule-Thomson (J-T) valve in some embodiments. The liquid is forced through a J-T valve or plug, and its temperature decreases. The multiphase stream 5 is a mixed phase liquid-vapor stream, has a temperature lower than that of an initial temperature of the first stream 1 from the cryotank 20.

The liquid-vapor splitter 90 is fluidly coupled to the expansion valve 80 and is configured to separate the liquid phase 7 and the gas phase 6 in the multiphase stream 5. The liquid phase 7, is configured to be returned into the cryotank 20. Such a returned liquid phase 7 provides cooling duty to the cryotank 20 to minimize or eliminate boil-off of the liquefied fuel such as liquid hydrogen.

The exemplary system 100 may further comprise an interlock chamber 94, which is fluidly coupled to the cryotank 20 and is configured to return the liquid phase 7 into the cryotank 20. The interlock chamber 94 may include at least two ports, which can be opened in sequence to allow delivery of a lower pressure liquid into the cryotank 20 with a higher pressure. The interlock chamber 94 may also include a check valve combined with operations that reduce the pressure in the cryotank 20 to be below the pressure of the cooled liquid (liquid phase 7). The liquid phase 7 may be mixed with the liquefied fuel 14 or sprayed into the headspace 22 of the cryotank 20 to mix with a vapor phase 16, which may exist in the headspace 22.

The gas phase 6 from the liquid-vapor splitter 90 may be provided to the heat exchanger 60 for providing additional cooling duty to the compressed stream 2 of the liquefied fuel 14 from the pump 40. The gas phase 6 after passing through the heat exchanger 60 is labelled as gas stream 8.

Figure 2:
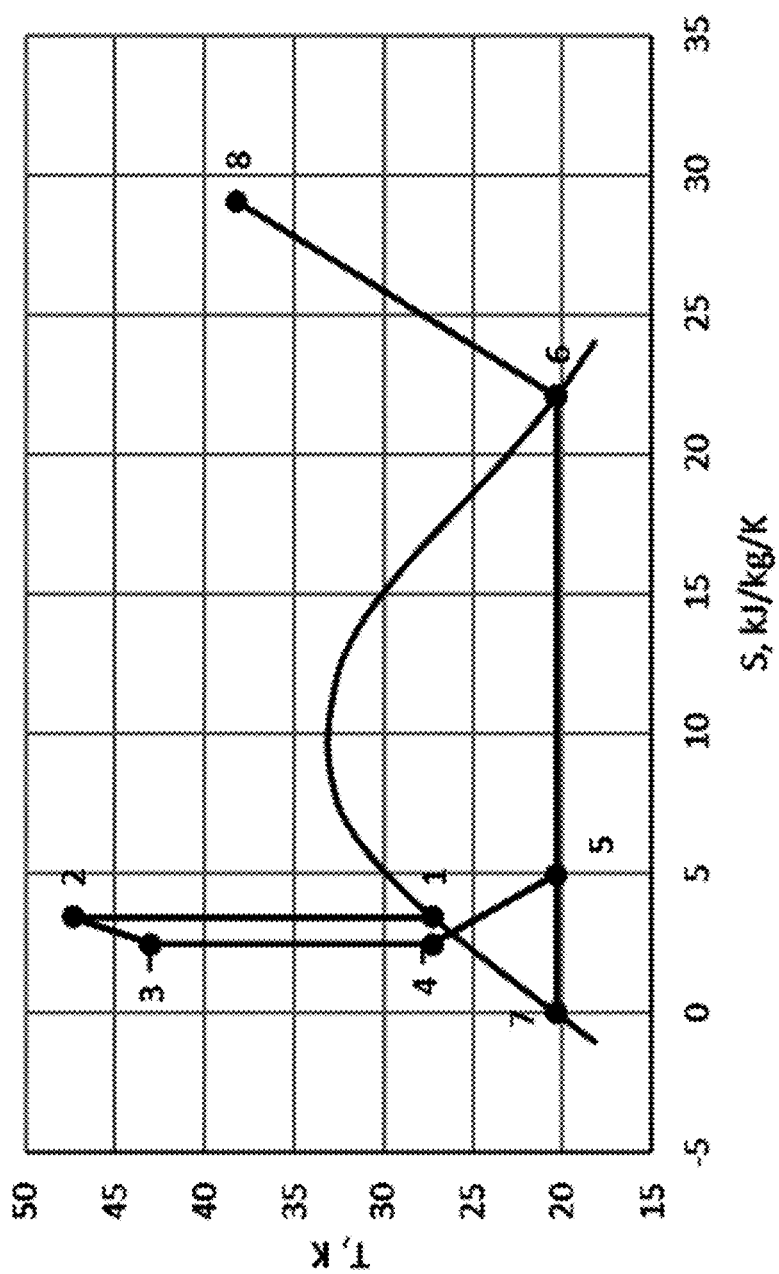
FIG. 2 is a temperature-entropy (specific entropy) diagram (i.e., T-S diagram) illustrating exemplary state conditions of one example in the exemplary system of FIG. 1.

As Example 1, the exemplary system 100 has been designed, with a submerged liquid pump for isentropic compression to increase the pressure of liquid hydrogen to 450 bar. FIG. 2 is a T-S diagram showing the thermodynamic states of the hydrogen as it proceeds through the exemplary system 100 with boil-off management. In T-S diagrams, a line parallel to the horizontal axis represents an isothermal process, and a line parallel to the vertical axis represents an isentropic process.

In FIG. 2, the process and the states of hydrogen include isentropic compression by the pump 40 (state of hydrogen from 1 to 2), cooling by the thermal exchanger 60 (from 2 to 3), liquid expansion by the expander turbine 70 (from 3 to 4), expansion to multiphase stream by the expansion valve 80 such as a J-T valve (from 4 to 5), and separation by splitter 90 (from 5 to 6 and 7). The hydrogen stream at states 2 and 3 are supercritical (SC). The change in gas phase from 6 to 8 in the thermal exchanger 60 provides additional cooling in the cooling process (from 2 to 3).

The states of the streams at each point are listed in Table 1.

TABLE 1

| Stream | Phase | liquid fraction | T (K.) | P (bar) | H (kJ/kg) | S, kJ/kg/K. |
|---|---|---|---|---|---|---|
| 1 | Liquid | 1.0 | 27.2 | 5 | 87.7 | 3.41 |
| 2 | SC |  | 47.4 | 450 | 689.1 | 3.41 |
| 3 | SC |  | 43.0 | 450 | 645.1 | 2.44 |
| 4 | Liquid |  | 27.3 | 30 | 100.1 | 2.44 |
| 5 | Mixed | 0.776 | 20.3 | 1 | 100.1 | 4.927 |
| 6 | Saturated vapor | 0 | 20.3 | 1 | 448.5 | 22.066 |
| 7 | Saturated liquid | 1.0 | 20.3 | 1 | −0.4 | −0.021 |
| 8 | Vapor stream as coolant | 0 | 38.2 | 1 | 645.1 | 29.04 |

In the thermodynamic cycle of Example 1, a liquid stream 1 of hydrogen is extracted from the cryotank 20. In this example, the tank pressure is 5 bar, the temperature is 27 K, and the stream 1 is a saturated liquid. The pump isentropically compresses the liquid hydrogen stream to 450 bar while the temperature is 47.4 K. The hydrogen stream 2 is supercritical. Such a supercritical hydrogen stream is heat-exchanged with lower temperature gas (the vapor phase 6) to cool its temperature to 43.0 K. The cooled supercritical stream 3 is isentropically expanded through a turbine 70 to 30 bar (a) to avoid two-phase flow at the turbine exit. The temperature is 27.3K. A Joule-Thompson valve is used to expand stream 4 produce a multiphase saturated liquid-saturated vapor stream 5. In this example, the multiphase stream 5 is at 1 bar, and 20.3K. Based on an enthalpy balance, the stream includes 77.6% liquid and 22.4% vapor. After separation, it becomes a saturated liquid 7 and a saturated vapor 6, both of which are at 1 bar(a). The vapor 6 is used to cool the supercritical hydrogen stream exiting the pump (above). The vapor stream cools the supercritical hydrogen stream from 47K to 43K. The vapor stream then exits the boil-off management system at 38.2 K. The vapor stream lost 44.04 kJ energy.

The liquid stream 7 at 20K and 1 bar is returned to the tank. An interlock chamber is used to manage the pressure differential to return the liquid to the tank at 5 bar. The net cooling duty delivered to the tank is 68 lath/kg $H_2$ pumped. Using measured electrical energy requirement for the pump, 720 kJ.e/kg $H_2$ pumped (0.2 kWh/kg), the energetic efficiency is 9.5%. This energetic efficiency compares favorably to cryocooler systems, which can draw kilowatts of power to deliver cooling power on the order of Watts in similar temperature ranges, corresponding to efficiencies <1%.

Figure 3:
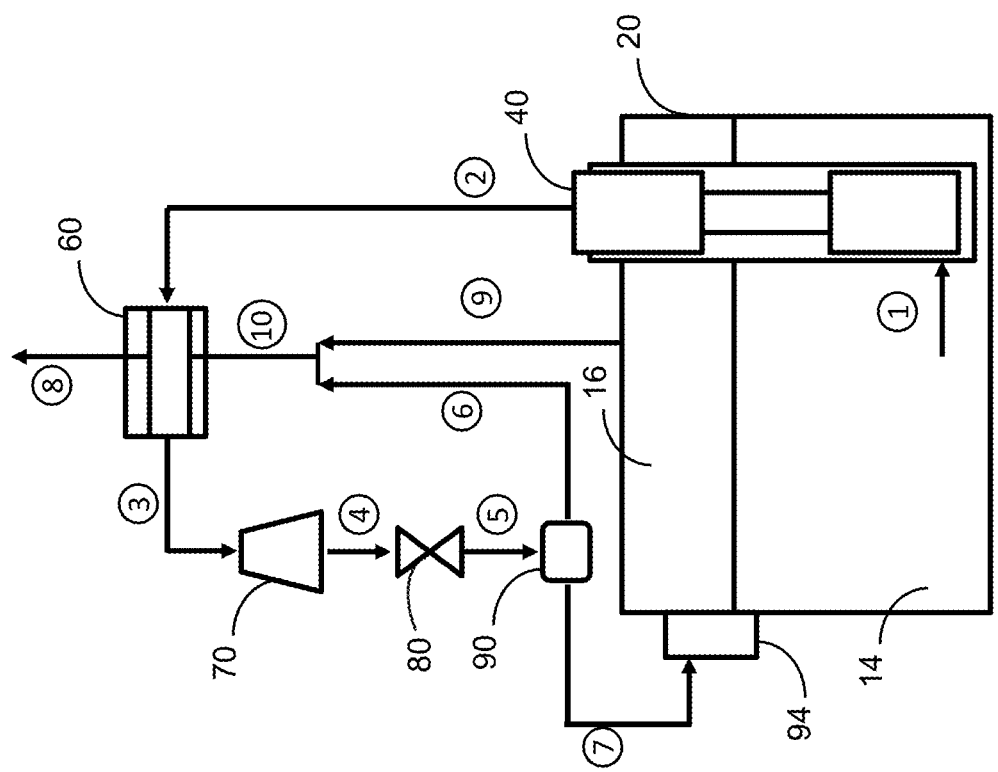
FIG. 3 is a block diagram illustrating a second exemplary system and flow paths of liquid, vapor and supercritical fluid in accordance with some embodiments.

Referring to FIG. 3, an exemplary system 200 is illustrated. The components for the exemplary system 200 are the same as those in the exemplary system 100, except that the cryotank 20 may be configured to provide a vapor phase 16 of the liquefied fuel 14 from the headspace 22 of the cryotank 20 to the heat exchanger 60 for providing additional cooling duty to the first stream (i.e., stream 2) of the liquefied fuel from the pump 40.

Figure 4:
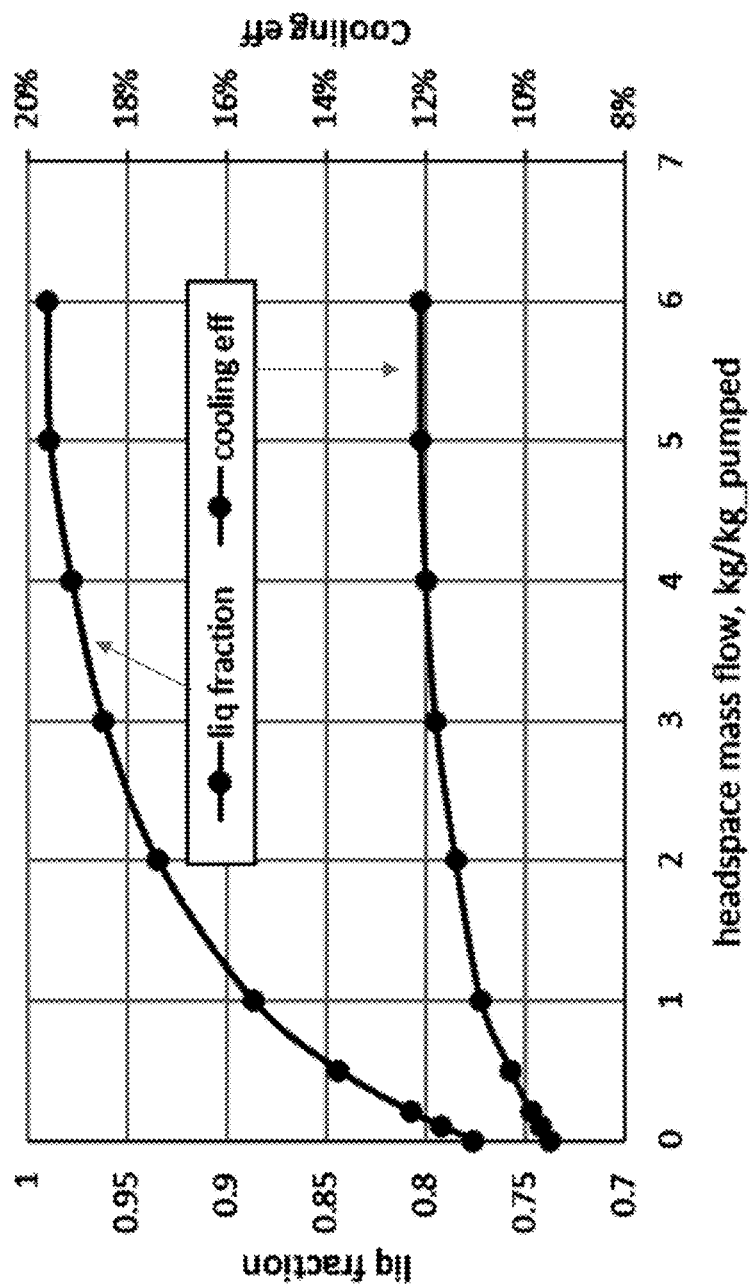
FIG. 4 shows the effect of headspace flow on liquid fraction after Joule-Thomson (J-T) expansion and cooling efficiency.
Figure 5:
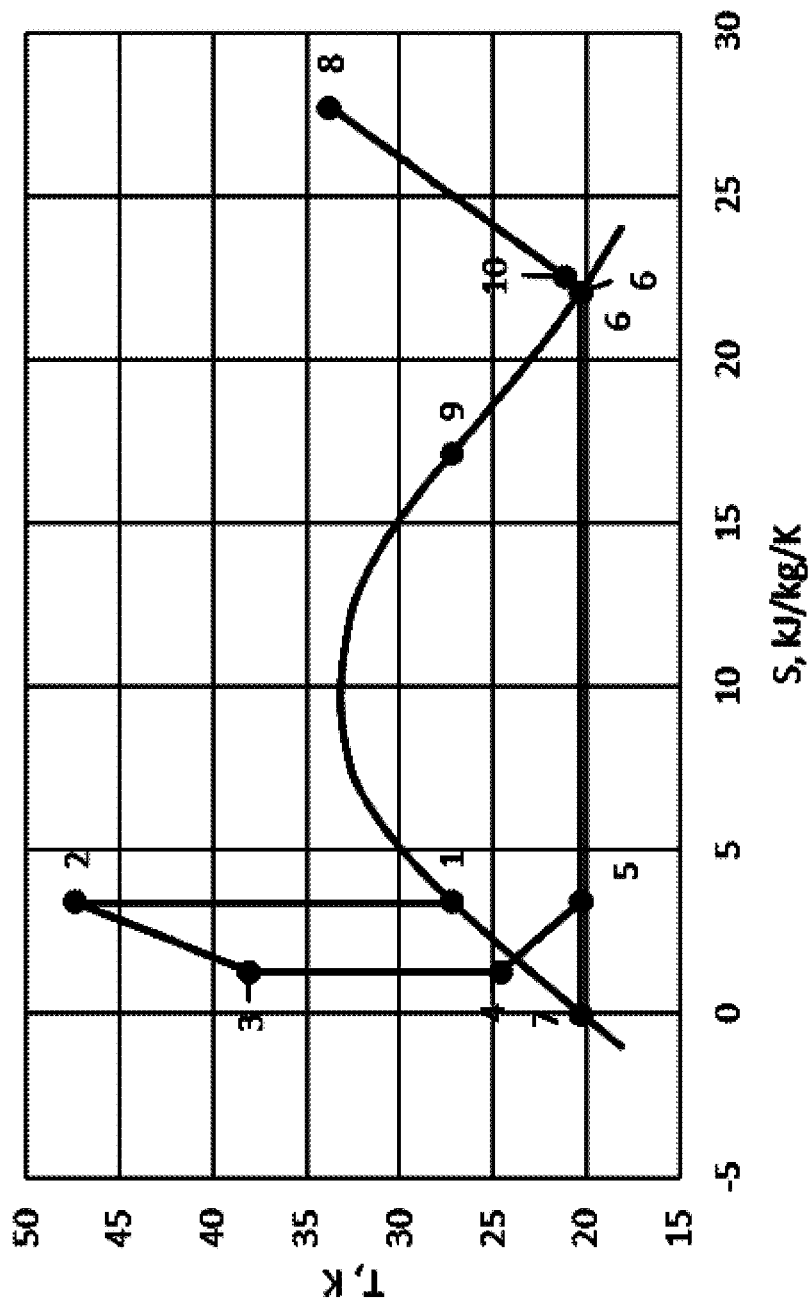
FIG. 5 is T-S diagram illustrating exemplary state conditions of one example in the exemplary system of FIG. 3.

As Example 2, the exemplary system 200 has been designed with P200H pump to 450 bar with headspace gas 9 (vapor 16 becomes stream 9 after exiting cryotank 20) as an additional coolant. Cooling of the compressed gas is performed using a mixture of the headspace vapor 9, which is saturated at cryotank pressure (5 bar in Example 2) and the J-T flash gas (stream 6, saturated vapor in Example 2). The resulting mixture is stream 10 at 1 bar and 21.1K. Ideally a two-step process would be more efficient thermodynamically with less exergy destruction where the warmer headspace gas (stream 9) cools the pump discharge (stream 2) first, then the colder J-T flash gas (stream 6) cools the pump discharge further, but such a two-step process is more complicated and potentially more costly. Instead, the mix stream 10 is used to cool the pump discharge By varying the amount of headspace gas relative to the J-T flash gas, various amount of cooling efficiency can be achieved, as illustrated in FIG. 4. FIG. 4 shows the impact of headspace flow on liquid fraction after J-T expansion and cooling efficiency. Headspace mass flow is in a ratio to the pump discharge flow rate, and cooling efficiency is the cooling power of the J-T flash liquid at 1 bar relative to pump energy consumption (0.2 kWh/kg). The abbreviated terms "liq" and "eff" in FIG. 4 represent "liquid," and "efficiency," respectively. Higher headspace gas flow increases liquid fraction and cooling efficiency, but it has a diminishing return behavior as liquid fraction approaches 100%. The best return on investment might be 0.5 kg of headspace gas per kg of pump discharge flow because it is in the steepest portion of the curves. The T-S diagram using this condition is illustrated in FIG. 5, which shows the thermodynamic states of the streams in Example 2. The states of the streams are also listed in Table 2

TABLE 2

| Stream | Phase | liquid fraction | T (K.) | P (bar) | H (kJ/kg) | S, kJ/kg/K. |
|---|---|---|---|---|---|---|
| 1 | Liquid | 1.0 | 27.2 | 5 | 87.7 | 3.41 |
| 2 | SC |  | 47.4 | 450 | 689.1 | 3.41 |
| 3 | SC |  | 38.1 | 450 | 597.4 | 1.26 |
| 4 | Compressed liquid |  | 24.6 | 30 | 69.6 | 1.26 |
| 5 | Mixed | 0.844 | 20.3 | 1 | 69.6 | 3.42 |
| 6 | Saturated vapor | 0 | 20.3 | 1 | 448.5 | 22.07 |
| 7 | Saturated liquid | 1 | 20.3 | 1 | −0.4 | −0.02 |
| 8 | vapor | 0 | 33.8 | 1 | 597.4 | 27.72 |
| 9 | Saturated vapor | 0 | 27.2 | 5 | 460.4 | 17.10 |
| 10 | vapor | 0 | 21.1 | 1 | 457.6 | 22.51 |

As Example 3, the exemplary system 200 has also been designed with isentropic pumping to 900 bar with headspace cooling. Example 2 demonstrates that using headspace gas improves cooling efficiency, thus no headspace gas flow is a special case. In Example 3, the exemplary system 200 is used while stream 2 is compressed to 900 bar.

Figure 6:
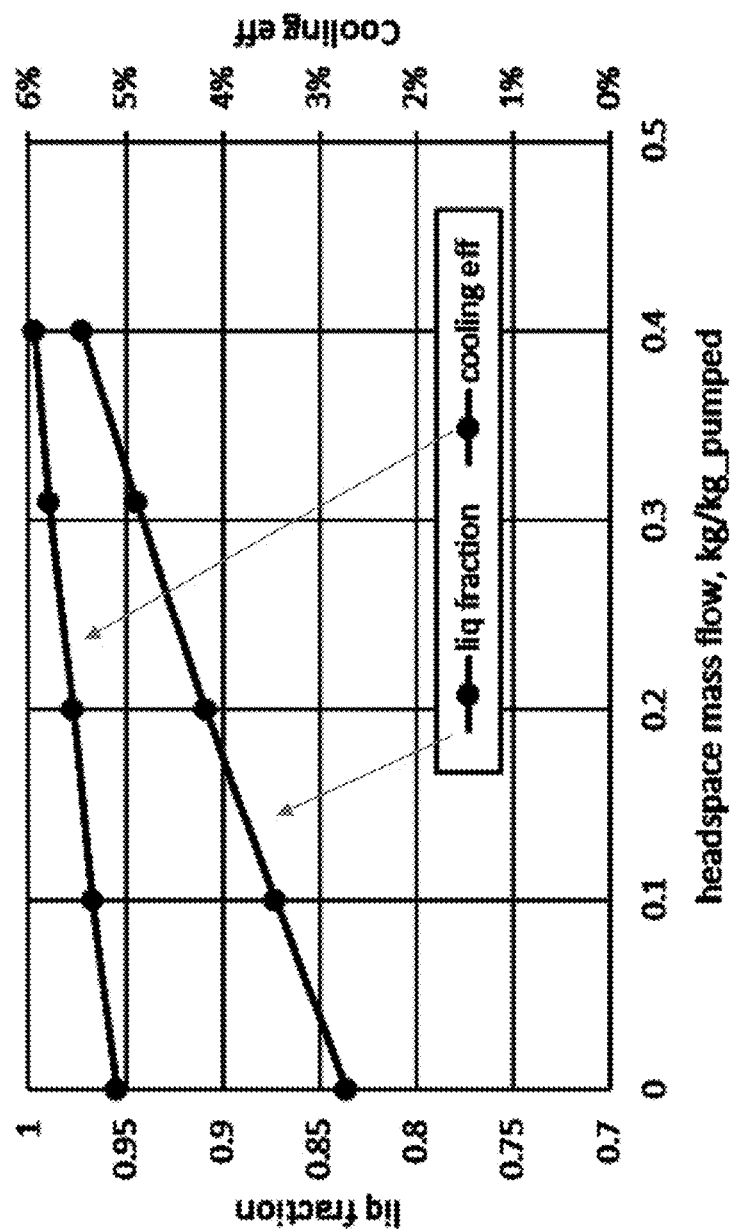
FIG. 6 shows the effect of headspace flow on liquid fraction after Joule-Thomson (J-T) expansion and cooling efficiency with pump discharge pressure at 900 bar.

FIG. 6 shows the impact of the headspace flow on liquid fraction after the J-T expansion and cooling efficiency with pump discharge pressure at 900 bar. 0.4 kWh/kg pumping energy is used for 900 bar pumping.

In Example 3, the pump 40 is nominally isentropic, and stream 2 is at a higher temperature than that in Example 1, because the outlet pressure of the pump is higher. In addition, cooling duty is provided using a combination of headspace gas (stream 9) and the saturated vapor produced after J-T expansion (stream 6). Relative to Example 1, compression of stream 2 to a higher pressure results in a higher fraction of liquid after J-T expansion even without headspace gas cooling (0.836 vs. 0.776). Cooling duty is increased, but so is the electrical energy required for pumping—double of that at 450 bar to 0.4 kWh/kg. In addition, the small amount of vapor after the J-T expansion means that the majority of cooling of stream 2 is accomplished using J-T flash gas (stream 6).

Table 3 show the streams and thermodynamic states for Example 3, with 0.2 kg of headspace gas flow per kg of pump discharge (stream 2) flow.

TABLE 3

| Stream | Phase | liquid fraction | T (K.) | P (bar) | H (kJ/kg) | S, kJ/kg/K. |
|---|---|---|---|---|---|---|
| 1 | Liquid | 1.0 | 27.2 | 5 | 87.7 | 3.41 |
| 2 | SC |  | 58.3 | 900 | 1199.5 | 3.41 |
| 3 | SC |  | 40.7 | 900 | 1031.9 | 0.01 |
| 4 | compressed liquid |  | 21.7 | 30 | 40.6 | 0.01 |
| 5 | Mixed | 0.909 | 20.3 | 1 | 40.6 | 1.997 |
| 6 | Saturated vapor | 0 | 20.3 | 1 | 448.5 | 22.07 |
| 7 | Saturated liquid | 1 | 20.3 | 1 | −0.4 | −0.02 |
| 8 | vapor | 0 | 75.0 | 1 | 1031.9 | 36.13 |
| 9 | vapor | 0 | 27.2 | 5 | 456.7 | 22.46 |
| 10 | mixed vapor | 0 | 21.0 | 1 | 456.7 | 22.46 |

Figure 7:
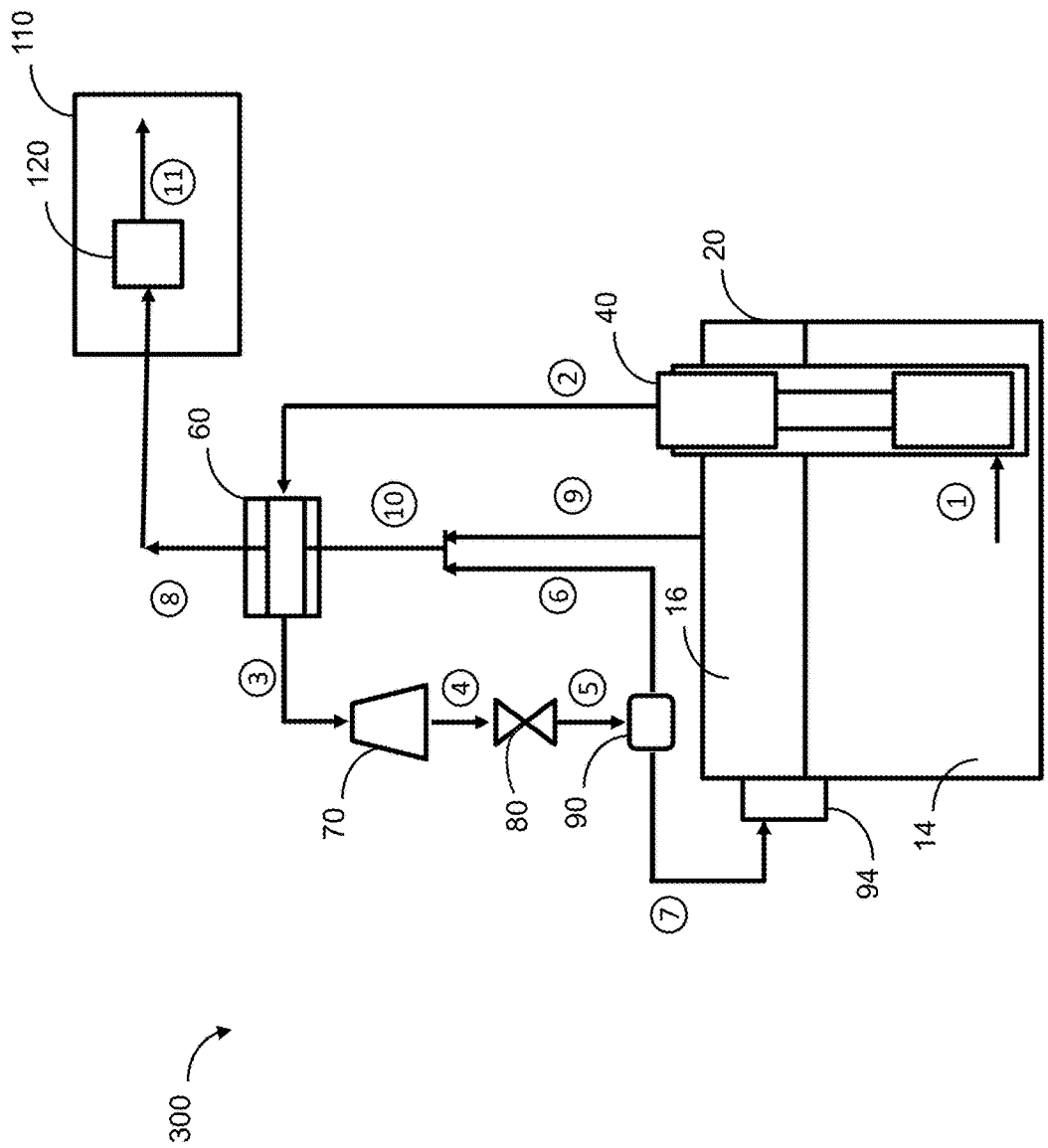
FIG. 7 is a block diagram illustrating a third exemplary system with integration of the boil-off management with downstream electricity generation using hydrogen from the cryotank in accordance with some embodiments.

Referring to FIG. 7, an exemplary system 300 is illustrated. The exemplary system 300 is the same as the exemplary system 200, except that the exemplary system 300 further comprises a backup power 120. The exemplary system 300 shows an integration of the boil-off management system with a downstream electricity generation unit. The backup power unit is configured to receive the gas 8 from the heat exchanger 60 and generate electrical power. The backup power unit 120 comprises one or more fuel cells or combustion engines for power generation. The exhaust 11 may be water vapor. Optionally, one or more combustion engines can be used in the backup power unit 120 to generate electricity through a thermal cycle. Suitable examples of combustion engines include, but are not limited to, a reciprocating engine, a gas turbine or microturbine, and a hydrogen turbine.

As Example 4, the exemplary system 300 has also been designed, with 450 bar of pump discharge and electricity generation using a polymer electrolyte membrane (PEM) fuel cell or cells. This embodiment involves integration of the boil-off management system with downstream electricity generation using $H_2$ from the cryotank 20. This example shows the use of a backup power unit 120 having a PEM fuel cell to generate electricity, with 20 kWh/kg $H_2$ vapor fed to the PEM fuel cell. In this example, a portion of the electricity generated by the PEM system is used to power the pump 40, corresponding to 0.2 kWh/kg $H_2$ drawn from the cryotank 20.

Figure 8:
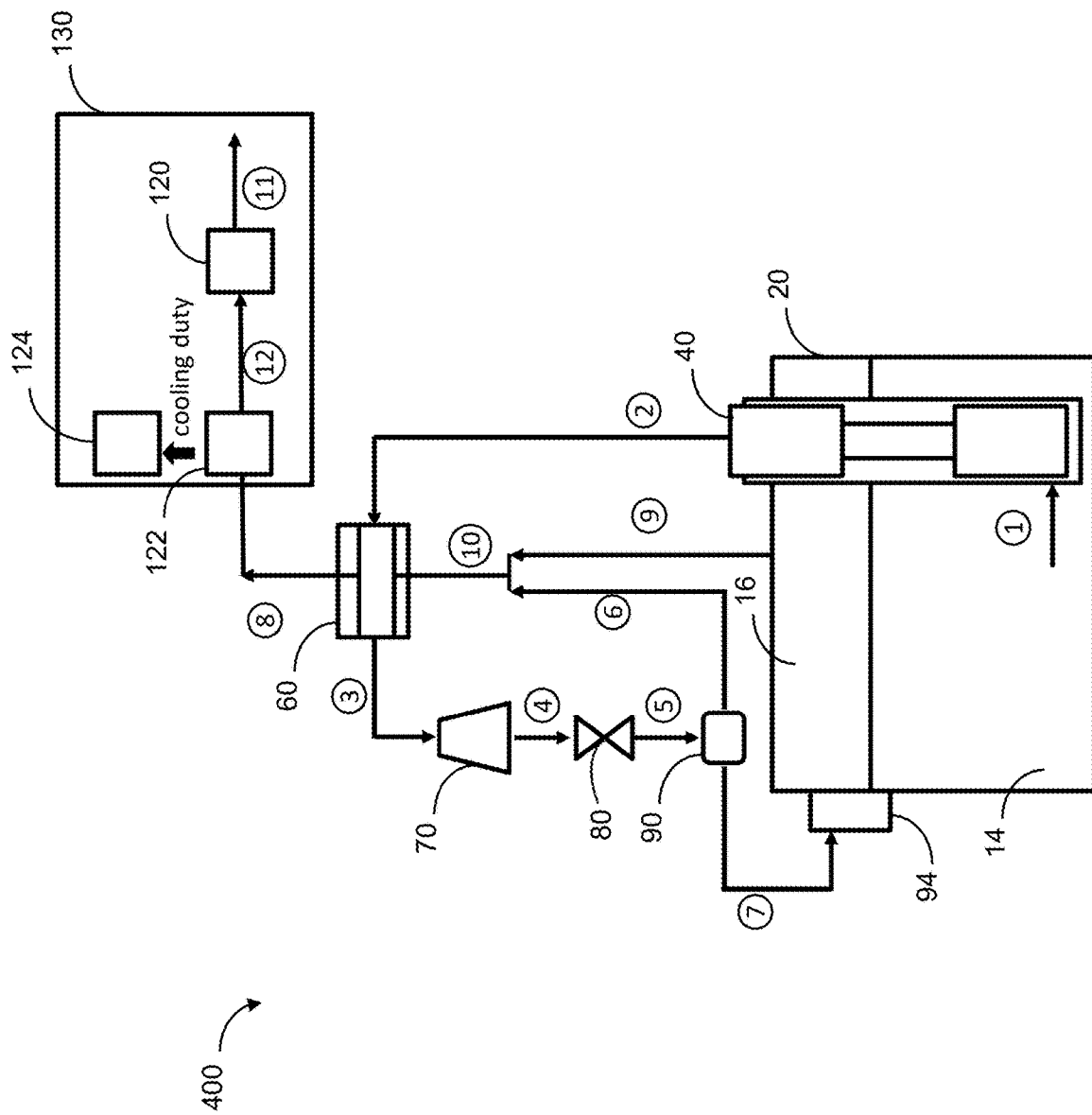
FIG. 8 is a block diagram illustrating a fourth exemplary system with integration of the boil-off management with downstream electricity generation and a refrigeration unit providing cooling duty in accordance with some embodiments.

Referring to FIG. 8, an exemplary system 400 is illustrated. The exemplary system 400 is the same as the exemplary system 200, except that the exemplary system 400 further comprises a backup power 120, and a refrigeration unit 122 coupled with the heat exchanger 60. The exemplary system 400 shows an integration of the boil-off management system with a downstream electricity generation unit and a refrigeration unit for data center cooling. The refrigeration unit 122 is configured to receive the gas 8 from the heat exchanger 60 and provide cooling duty to a facility 124 such as a data center. The backup power unit 120, which can be coupled to the refrigerator 122, and configured to receive hydrogen gas from the heat exchanger 60 and/or the refrigerator 122 and generate electrical power. The backup power unit 120 comprises one or more fuel cells or combustion engines for power generation.

As Example 5, the exemplary system 400 has also been designed. For illustrative purposes, the pump discharge pressure is set at 450 bar, and ratio of headspace gas mass flow to pump discharge flow is set to 0.5. This example has integration of the boil-off management system with downstream electricity generation using $H_2$ from the cryotank 20, with additional cooling duty extracted from the vapor $H_2$ stream before it is used for electricity generation (e.g., from gas 8 to gas 12). Optional integration with a cooling load in a facility 124 such as a data center is shown in FIG. 8.

Example 5 shows the use of a heat exchanger 60 to extract cooling duty from the vapor $H_2$ stream after exchanging with the compressed liquid $H_2$ stream, but before it enters the backup power unit 120 such as a PEM fuel cell power generation unit. The cooling duty is used to provide cooling duty to a data center. The cooling duty can also be used by any process that requires a cold sink with a temperature less than 0° C. In Example 5, the cryotank is at 5 bar, and the exit temperature of the vapor from the heat exchanger is 33.8K, the cooling potential in raising the stream to −20 C is approximately 1.0 kWh/kg $H_2$.

Figure 9:
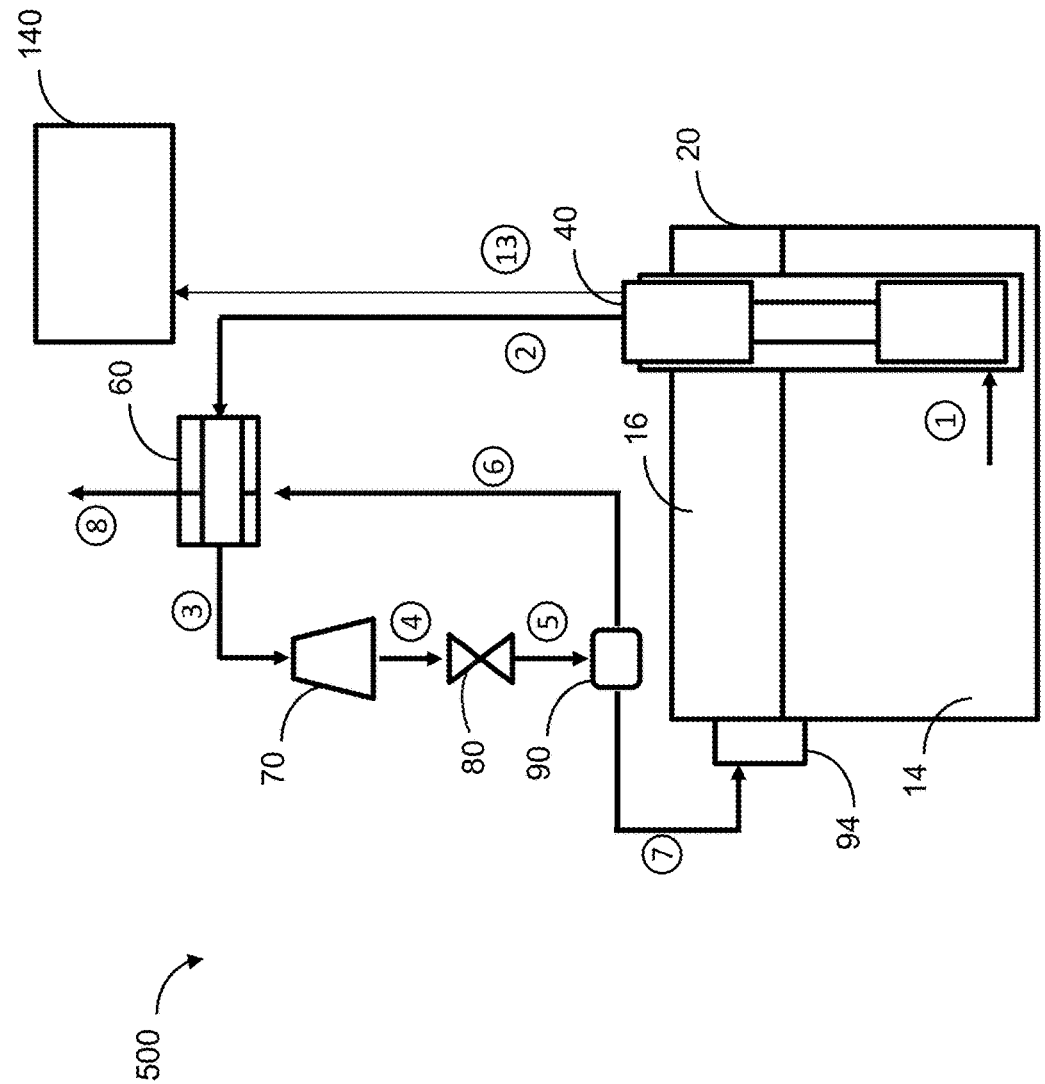
FIG. 9 is a block diagram illustrating a fifth exemplary system comprising a refueling station in accordance with some embodiments.

Referring to FIG. 9, an exemplary system 500 is illustrated. The exemplary system 500 is the same as the exemplary system 100, except that the exemplary system 500 further comprises a refueling station 140, which includes a dispenser. The exemplary system 500 shows an integration of the boil-off management system with a hydrogen refueling station for fuel cell vehicles. The refueling station 140 is configured to receive a second stream 13 of the liquefied fuel 14 from the cryotank 20 and dispense it in a form of a gaseous fuel or liquid fuel to a receiving fuel tank such as an onboard fuel tank for a vehicle. The refueling station 140 may also include an additional heat exchanger for converting liquefied fuel 14 from the cryotank 20 to a gaseous fuel to be dispensed.

As Example 6, the exemplary system 500 has also been designed. In such a system, the boil-off management system is integrated with a hydrogen refueling station (HRS) for fuel cell vehicles. In the refueling station 140, a compressed liquid H2 from the pump 40 is used to ultimately deliver precooled, compressed gas fills or compressed liquid hydrogen to onboard H2 storage tanks for hydrogen fuel cell vehicles.

In addition to the integration with the HRS, a feature in Example 6 is the return of the cooled liquid. Rather than using an interlock, the cooled liquid 7 is stored in a chamber 94 with a check valve. The pump 40 is also used to deliver hydrogen for refueling purposes. Under some conditions (e.g., high flow operation), the pressure in the cryotank 20 drops. During the operation cycle of the HRS, the pressure in the cyrotank 20 increases when the system is not dispensing fuel due to boil-off associated with static heat leak into the cryotank 20. During HRS operation, the removal of fuel can cause the pressure to decrease. In this example, when the pressure of the cryotank drops below the pressure of the cooled liquid 7, it can flow into the cryotank 20 through the check valve.

Figure 10:
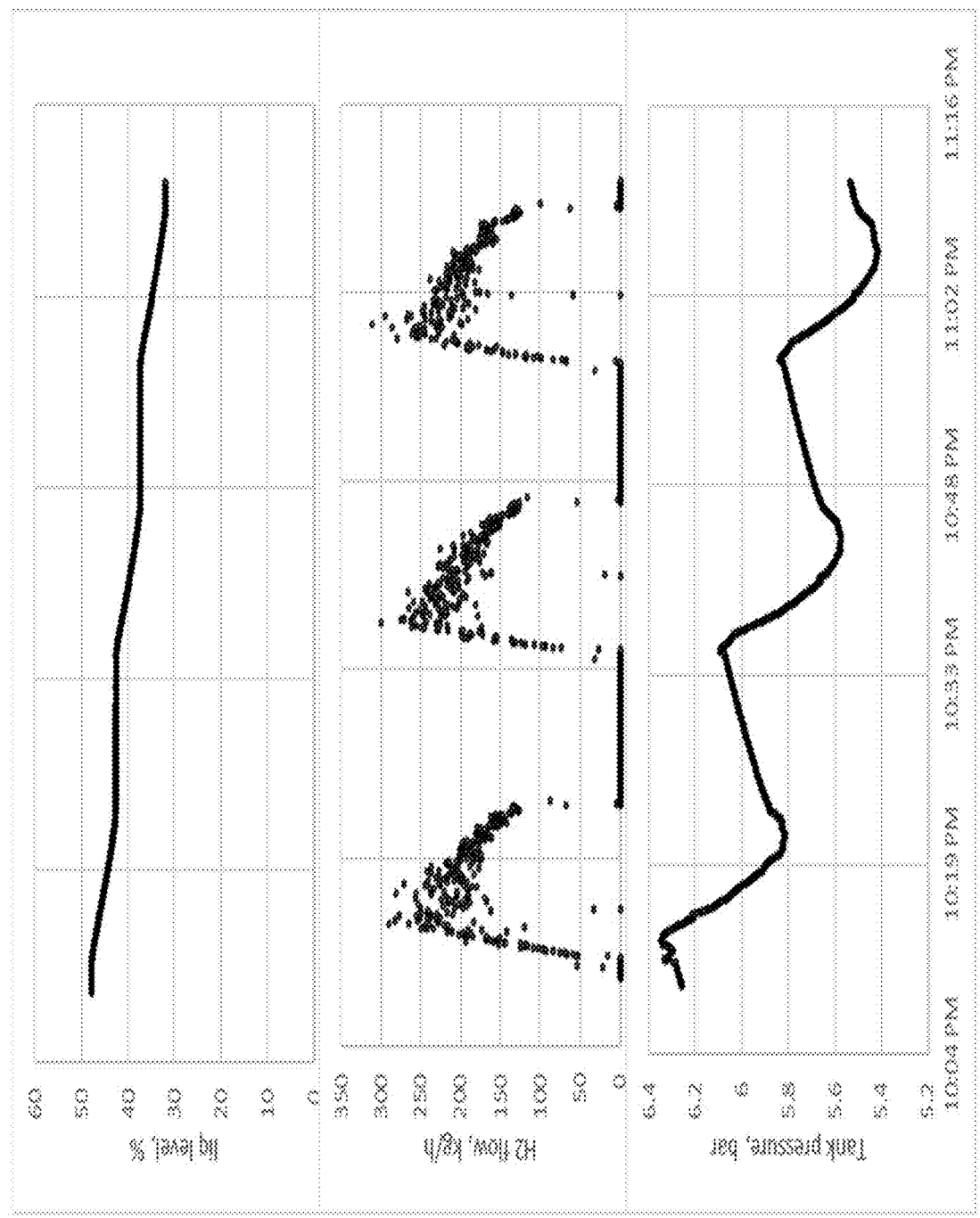
FIG. 10 shows the liquid level in a cryotank, the hydrogen mass flow rate, and the headspace pressure in the cryotank during an exemplary fueling operation of liquid hydrogen refueling station (LHRS).
Figure 11A:
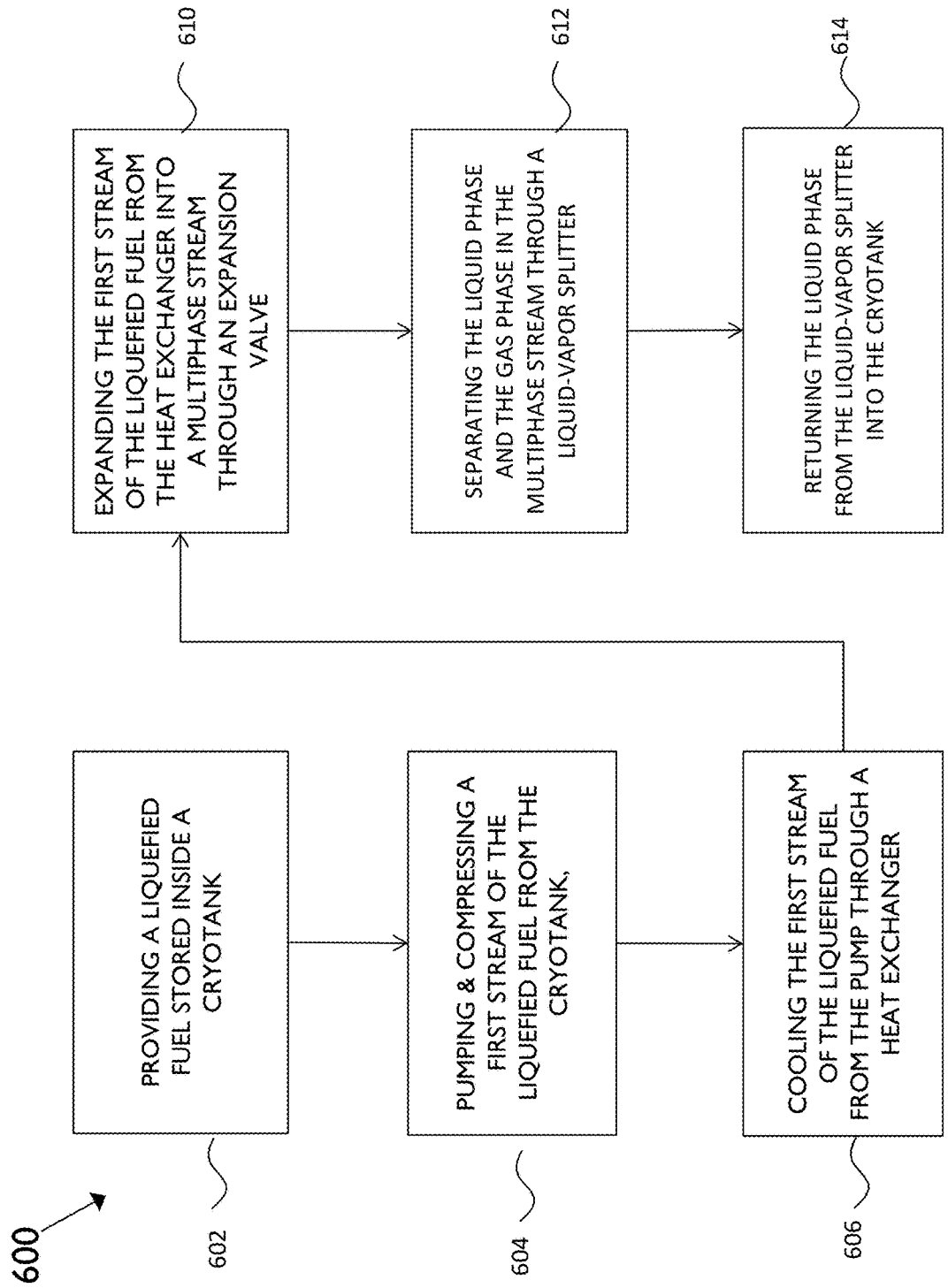
FIG. 11A is a flow chart illustrating an exemplary method in accordance with some embodiments.
Figure 11B:
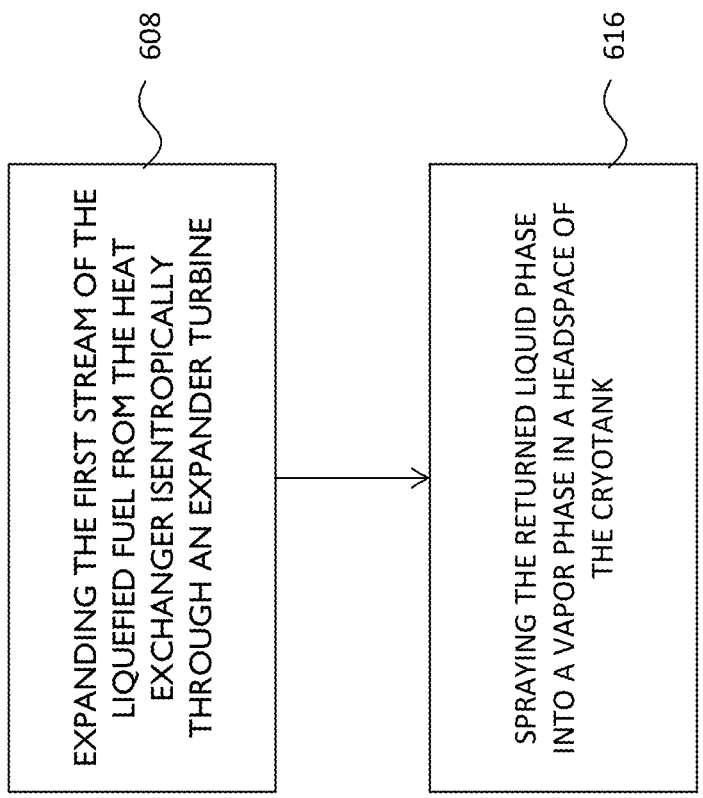
FIGS. 11B and 11C are flow charts illustrating some steps, which might be included in the exemplary method of FIG. 11A.
Figure 11C:
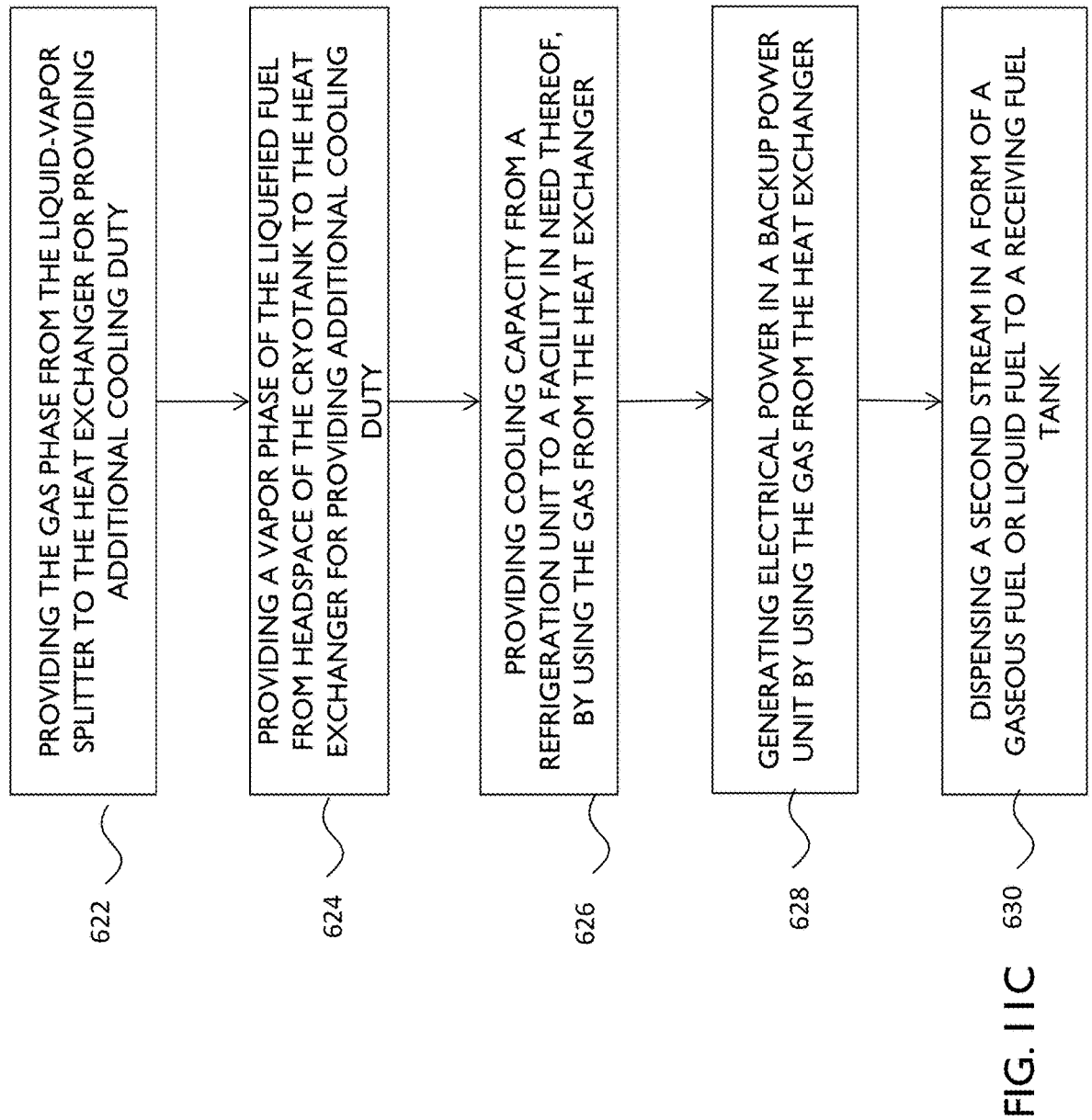

FIG. 10 shows headspace pressure in a cryotank during a LHRS fueling operation. The pressure drops from 6.3 bar to 5.5 bar during the course of the refueling three buses back-to-back. In FIG. 10, the liquid level in the cryotank, the hydrogen mass flow rate (in kg/hr), and the headspace pressure in the cryotank (in bar(g)) are shown in from the top, middle, to the bottom panels, respectively. The curves were generated from a test system database. Each of the three back-to-back fills lasted approximately 12 minutes, dispensed approximately 40 kg of hydrogen, and lowered the cryotank headspace pressure by 0.5 bar or more. However, during the idle time between fills, headspace pressure recovered approximately 0.2 bar as the cryotank two-phase system equilibrated and static heat leak crept in. The results in FIG. 10 provides evidences to the pressure drop as described above, which might be hard to achieve in a pump, and also support the dynamic method to return colder liquid stream to the cryotank by pumping out warmer liquid hydrogen through a refueling operation.

In the system and the method, the refueling process may be performed on a regular basis. The cooling duty may be generated regularly from the refueling station. The backup power may be generated on an intermittent basis.

Referring to FIG. 11A, the present disclosure also provides an exemplary method 600 as described above and also described below generally.

At step 602, a liquefied fuel 14 is provided and stored inside a cryotank 20. In some embodiments, the liquefied fuel 14 comprises or is hydrogen.

At step 604, a first stream 1 of the liquefied fuel is pumped from the cryotank 20, and compressed to an increased pressure, through a pump 40 fluidly coupled with the cryotank 20. Stream 1 and subsequent streams are referred as the first stream. The pump 40 may comprise one or more submerged liquid pumps disposed inside the cryotank 20.

At step 606, the first stream (i.e., stream 2 at this stage) of the liquefied fuel 14 from the pump 40 is cooled through a heat exchanger 60 coupled with the pump 40. The cooling process may be substantially isobaric.

At step 610, the first stream (i.e., stream 3 at this stage) of the liquefied fuel 14 from the heat exchanger 60 is expanded into a multiphase stream 5 through an expansion valve 80. An expansion valve is a Joule-Thomson valve in some embodiments. The multiphase stream 5 comprises a liquid phase 7 and a gas phase 6, and has a temperature lower than that of an initial temperature of the first stream from the cryotank 20.

Referring to FIG. 11B, the exemplary method 600 may further comprise step 608 before step 610. At step 608, the first stream (i.e., stream 3) of the liquefied fuel from the heat exchanger 60 is expanded isentropically through an expander turbine 70 coupled with the heat exchanger and the expansion valve.

Referring back to FIG. 11A, at step 612, the liquid phase 7 and the gas phase 6 in the multiphase stream 5 are separated through a liquid-vapor splitter 90, which is fluidly coupled to the expansion valve 80.

At step 614, the liquid phase 7 is returned from the liquid-vapor splitter 90 into the cryotank 20. In some embodiments, the liquid phase 7 is returned into the cryotank 20 through an interlock chamber 94 fluidly coupled to the cryotank. The liquid phase 7 can be fed into the liquid phase in the cryotank. Step 614 may include step 616 in FIG. 11B. At step 616, the liquid phase 7 can be sprayed into a vapor phase in the headspace 22 of the cryotank 20 in a top-fill process.

In some embodiments, at step 604, the flow rate of $LH_2$ stream is up to 280 kg/h using a single pump (e.g., using P200H pump basis). When multiple pumps are used, each pump has a flow rate capacity of up to 280 kg/h. The pressure of the hydrogen stream after being pumped is up to about 90 MPa. After step 606, the temperature of high pressure stream after cooling may have a temperature of the liquid hydrogen extracted from the cryotank as a lower limit. The upper limit may be the theoretical temperature achieved by isentropic compression to the pump outlet pressure (point 2 on a T-S diagram, e.g. FIG. 5, when there is no cooling of the stream 2). After step 610 for expansion, the fraction of the liquid stream 6 may be in a range of from 0.5 to about 0.999. The liquid stream 7 may have a temperature in a range of from about 20 K as the lower limit, and a temperature just lower than that of the liquid stream extracted from the cryotank as the upper limit. The gas from the headspace for supplemental cooling, in conjunction with saturated vapor after J-T expansion, may have a flow rate ranging from 0 kg/kg.pumped to 10 kg/kg.pumped as a ratio of headspace gas flow to pump discharge flow.

Referring to FIG. 11C and FIGS. 7-8, the exemplary method 600 may further comprise one or more of steps 622, 624, 626, 628, and 630. At step 622, the gas phase 6 from the liquid-vapor splitter 90 is provided to the heat exchanger 60 for providing additional cooling duty to the first stream 2 of the liquefied fuel from the pump 40.

At step 624, a vapor phase 16 of the liquefied fuel from a headspace 22 of the cryotank 20 is provided to the heat exchanger 60 for providing additional cooling duty to the first stream 2 of the liquefied fuel from the pump 40.

The exemplary may also comprise one or both of steps 626 and 628. At step 626, cooling capacity is provided from a refrigeration unit 122 coupled with the heat exchanger to a facility in need thereof, by using the gas 8 from the heat exchanger 60. The refrigeration unit 122 provides cooling capacity to a facility or environment where cooling is needed. For example, the cooling capacity from the refrigeration unit 122 may be used for cooling the data center. The backup electrical power and the cooling capacity can also be supplied to other facilities, for example, a distribution center (e.g., for HVAC or refrigeration).

At step 628, electrical power is generated in a backup power unit 120 by using the gas 8 from the heat exchanger 60. In some embodiments, the electrical power is generated through one or more fuel cells in the backup power unit 120. Optionally, one or more combustion engines can be used in the backup power unit 120 to generate electricity through a thermal cycle. Suitable examples of combustion engines include, but are not limited to, a reciprocating engine, a gas turbine or microturbine, and a hydrogen turbine. The electricity power from the backup power unit 120 may be provided to a data center or the pump 40.

Referring to FIG. 11C and FIG. 9, at step 630, a second stream 13 of the liquefied fuel is provided from the cryotank to a refueling station comprising a dispenser, and then dispensed in a form of a gaseous fuel or liquid fuel to a receiving fuel tank, for example, an onboard fuel tank in a vehicle.

Referring to FIG. 12, a system 150 proposed by Mustafi et al. is shown for comparison. The cryogenic propellant such as hydrogen (TC1) is extracted from the tank 21. A portion is passed through a J-T valve 81 to expand into a two-phase mixture (TC2) at a lower pressure and a lower temperature. Through a pump 41, most of the liquid hydrogen is pumped into the shell of a concentric tube exchanger 61 as a single phase liquid. The two-phase hydrogen (TC 2) is passed into the center tube of the concentric tube heat exchanger, and extracts heat from the single-phase hydrogen. The two-phase hydrogen totally vaporizes and is vented (TC 3) to a flare stack through a compressor 71, and none of the expanded hydrogen is returned to the tank. A four-stage compressor is needed, and this is identified as a large and heavy piece of equipment. Helium gas must be added to prevent collapse of the tank.

As a comparison, the systems provided in the present disclosure have at least the differences as described herein. For example, a pump 40 is used to increase the pressure of liquid hydrogen before isenthalpic expansion. A portion of the expanded hydrogen (e.g., liquid phase 7), is returned to the cryotank 20. A pressure equalization mechanism is used to return the liquid to the cryotank 20. The request for helium to maintain tank integrity is also eliminated. The need for a compressor 71 as described above is also eliminated.

The systems and the method address the challenges of energy consumption, system complexity, and control by using a single-stage compression step to deliver cooling duty to liquid $H_2$ stored in a cryotank 20. The systems operate in a unique manner. For example, a liquid hydrogen stream is extracted from the liquid hydrogen stored in the cryotank 20. The liquid stream 1 is compressed to at least 100 bar using a submerged liquid pump 40 that is nominally at the same entropy as the liquid hydrogen in the cryotank 20 in a theoretically isotropic compression process. The compressed (liquid/supercritical) stream 2 is cooled by heat exchange at approximately constant pressure with the gas 6 from the J-T expansion. Optionally, the vapor 9 from the headspace 22 of the cryotank 20 is used to provide additional cooling duty. Either of the vapor 9 from the headspace of the cryotank and the gas 6 is not returned to the tank after heat exchange, and they can be combined. The cooled (supercritical) stream is expanded, first with an expansion turbine (isentropically) to an intermediate pressure (e.g., 30 bar) to avoid two-phase formation, followed by a Joule-Thompson (J-T) throttling process to expand to a two-phase mixture at a pressure equal to or less than the pressure at which liquid was extracted from the cryotank to produce a saturated gas 6 and a liquid stream 7 at a lower temperature than the temperature of the liquid in the cryotank 20. The cooled liquid stream 7 is returned to the cryotank resulting in a net introduction of cooling duty to the tank. Mechanisms to deliver the liquid include the use of an interlock chamber 94, or decreasing the pressure of the cryotank 20 through refueling operations that withdraw $H_2$ from the tank at a rate that reduces the net pressure to the pressure of the expanded liquid stream. As described herein, after providing cooling duty, the hydrogen vapor or gas can also be used to generate electricity.

Further optimization is possible by changing the pump discharge pressure, the ending temperature of the isobaric cooling process, the ending pressure of the turbine expansion process, and the final pressure of the J-T expansion process. Pump discharge pressure, the cooling capacity of the turbine expansion process, and the ending temperature of the isobaric cooling process are interlinked and present opportunities for optimization. For example, FIG. 4 shows simulation results for compression using a submerged liquid pump operating on saturated liquid hydrogen at different inlet temperature and pressure conditions, compressed to different outlet pressures. The outlet temperature is a function of the inlet conditions and the exit pressure, and is bound by the thermodynamic limits imposed by ideal isothermal or isentropic compression processes. In other words, the lower bound on temperature is the inlet temperature and the upper bound on temperature is computed using a thermodynamic relationship assuming an isentropic compression process using hydrogen properties.

The systems as described herein can also be integrated with an upstream liquefaction system, where the boil-off management system is integrated with a cryotank used to store the product of the liquefaction process. The upstream components of the system may include a liquefier and a hydrogen production unit such as electrolyzer for converting water into hydrogen and oxygen. At least one or both of the liquefier and the hydrogen production unit can be powered by wind or solar power.

The systems described herein can also be integrated with a distribution network wherein $LH_2$ from the storage vessel is transported to one or more of the following: hydrogen refueling station for ground vehicles transportation such as heavy duty vehicles (HDV), light duty vehicles (LDV), and rail; industrial sites where the $H_2$ is used as part of a steel production process; industrial sites where the $H_2$ is used as part of a metal production process; and industrial sites where the $H_2$ is used in a combustion process to provide power and heat.

The use of a submerged liquid pump to enable compression of the liquid stream to achieve final temperature and pressures bounded by isothermal and isentropic limits. In the existing technology, external pumps are used and require either cool-down (resulting in additional boil-off losses). However, a submerged pump allows the practical implementation of the compression-expansion cycle described herein. For example, FIG. 4 shows the response curve for a submerged liquid pump that approaches the isentropic limit.

The cooled liquid hydrogen is returned to the cryotank, so the boil-off loss is reduced or minimized. The return mechanism includes an interlock chamber akin to an airlock, where the liquid enters, is equalized with the cryotank, the chamber is closed and pumped back to low pressure, and more liquid is admitted. The return mechanism may use a dynamic operating process in the cryotank, in which the pump is used to dispense $H_2$ for vehicle refueling at a sufficiently high rate to lower the pressure in the cryotank. The cooled liquid is returned to the cryotank when the cryotank pressure drops due to $H_2$ dispensing. The pressure then rises again as heat leak leads to boil-off.

The systems and the method also provides additional benefits as follows. For example, in such a simplified process, a submerged liquid pump and a single stage loop are used, and no cryo-cooler is needed.

The systems and the method provide energy efficiency. Delivery of cooling duty at temperatures less than 30K is a difficult and energy-intensive process. Assuming a pump energy consumption of 0.2 kWh.e/kg which creates a cooling duty of 68 kJ/kg.pumped (see Example 1). That cooling duty would condense approximately 0.15 kg hydrogen into liquid (hydrogen latent heat of condensation is 454 kJ/kg). In other words, 1.3 kWh.e/kg input is required to produce 1 kg of liquid. For reference, a full liquefaction process requires 3.9 kWh.e/kg theoretically and in practice on the order of 12 kWh/kg to produce liquid $H_2$, although most of this energy is used in the cooling of the $H_2$ to the boiling point and supplying energy for the para-ortho transition. Since liquid hydrogen is nominally 100% para-$H_2$, this method avoids energy penalties associated with the ortho-para transition, which can be significant when cooling gaseous $H_2$ during a liquefaction process.

The systems and the method also provide controllability. The cooling duty can be delivered by activating the submerged pump, and controlled by the pump flow rate. The pump is submerged and in thermal equilibrium with the liquid $H_2$ in the tank, so there is no boil-off associated with pump start-up.

The systems and the method also provide scalability. The submerged pumps have been demonstrated at 285 kg/hr scale. For purposes of the examples, a pump basis of 240 kg/hr was used in the systems described herein. This means a single pump can deliver cooling duty at the kW.th scale. Multiple pumps can be employed to increase the cooling duty for large cryotanks.

The systems and the method are also compatible with liquid hydrogen refueling stations. Integration with a liquid hydrogen refueling station that uses the liquid pump to deliver fuel to vehicles is one mechanism that enables return of the cooled liquid from the boil-off management system to the cryotank. In addition, use of the liquid tank to deliver fluid increases the utilization of the liquid pump for a value-added activity beyond boil-off management. This integration amplifies the benefits of simplified design, and also improves the economic value of the system by increasing the utilization of the liquid pump.

The system and the method provided in the present disclosure provide many advantages as described herein. For example, in some embodiments, the present disclosure provides a system for hydrogen storage and refueling. The system in the present disclosure minimizes or eliminate losses of liquefied fuel such as hydrogen or has zero losses of hydrogen boil-off. The hydrogen gas or vapor from the liquefied fuel in the storage tank can also be used for providing backup power, for example, to a pump, and providing cooling capacity, for example, to a data center.

In some embodiments, the systems provided in the present disclosure may further comprise one or more control units or a central unit (not shown in FIGS. 1, 3, and 7-9) for controlling the steps of the method and the fuel amount in each step or going through each component. The control unit(s) may be electronically connected with the related components in the system. The control unit may comprise one or more processors and at least one tangible, non-transitory machine readable medium encoded with one or more programs to be executed by the one or more processors. The control unit is configured to coordinate with each component so as to control the operation such as managing boil-off during storage, refueling the vehicles, cooling a data center, and supplying backup power.

The methods and system described herein may be at least partially embodied in the form of computer-implemented processes and apparatus for practicing those processes. The disclosed methods may also be at least partially embodied in the form of tangible, non-transient machine readable storage media encoded with computer program code. The media may include, for example, RAMs, ROMs, CD-ROMs, DVD-ROMs, BD-ROMs, hard disk drives, flash memories, or any other non-transient machine-readable storage medium, or any combination of these mediums, wherein, when the computer program code is loaded into and executed by a computer, the computer becomes an apparatus for practicing the method. The methods may also be at least partially embodied in the form of a computer into which computer program code is loaded and/or executed, such that, the computer becomes an apparatus for practicing the methods. When implemented on a general-purpose processor, the computer program code segments configure the processor to create specific logic circuits. The methods may alternatively be at least partially embodied in a digital signal processor formed of application specific integrated circuits for performing the methods. The computer or the control unit may be operated remotely using a cloud based system.

Although the subject matter has been described in terms of exemplary embodiments, it is not limited thereto. Rather, the appended claims should be construed broadly, to include other variants and embodiments, which may be made by those skilled in the art.

What is claimed is:

1. A system, comprising:
a cryotank configured to store a liquefied fuel therein;
a pump fluidly coupled with the cryotank and configured to provide a first stream of the liquefied fuel from the cryotank while compressing the first stream of the liquefied fuel to an increased pressure;
a heat exchanger coupled with the pump and configured to provide cooling duty to the first stream of the liquefied fuel from the pump;
an expansion valve configured to expand the first stream of the liquefied fuel from the heat exchanger into a multiphase stream comprising a liquid phase and a gas phase, the multiphase stream having a temperature lower than an initial temperature of the first stream from the cryotank; and
a liquid-vapor splitter fluidly coupled to the expansion valve and configured to separate the liquid phase and the gas phase in the multiphase stream, wherein the liquid phase is configured to be returned into the cryotank,
wherein the liquid-vapor splitter is configured to provide the gas phase to the heat exchanger for providing additional cooling duty to the first stream of the liquefied fuel from the pump.

2. The system of claim 1, wherein the liquefied fuel comprises hydrogen.

3. The system of claim 1, wherein the pump comprises one or more submerged liquid pumps disposed inside the cryotank.

4. The system of claim 1, further comprising an expander turbine coupled with the heat exchanger and the expansion valve, and configured to expand the first stream of the liquefied fuel from the heat exchanger isentropically.

5. The system of claim 1, wherein an expansion valve is a Joule-Thomson valve.

6. The system of claim 1, further comprising an interlock chamber fluidly coupled to the cryotank and configured to return the liquid phase into the cryotank.

7. The system of claim 1, wherein the cryotank is configured to provide a vapor phase of the liquefied fuel from a headspace of the cryotank to the heat exchanger for providing additional cooling duty to the first stream of the liquefied fuel from the pump.

8. The system of claim 7, further comprising at least one or both of:
a refrigeration unit coupled with the heat exchanger, wherein the refrigeration unit is configured to receive the gas from the heat exchanger and provide cooling duty to a facility; and
a backup power unit configured to receive the gas from the heat exchanger and generate electrical power.

9. The system of claim 1, wherein the backup power unit comprises one or more fuel cells to generate the electrical power.

10. The system of claim 1, further comprising a refueling station comprising a dispenser configured to receive a second stream of the liquefied fuel from the cryotank and dispense it in a form of a gaseous fuel or liquid fuel to a receiving fuel tank.

11. A method, comprising:
providing a liquefied fuel stored inside a cryotank;
pumping a first stream of the liquefied fuel from the cryotank, while compressing the first stream of the liquefied fuel to an increased pressure, through a pump fluidly coupled with the cryotank;
cooling the first stream of the liquefied fuel from the pump through a heat exchanger coupled with the pump;
expanding the first stream of the liquefied fuel from the heat exchanger into a multiphase stream through an expansion valve, the multiphase stream comprising a liquid phase and a gas phase and having a temperature lower than an initial temperature of the first stream from the cryotank;

separating the liquid phase and the gas phase in the multiphase stream through a liquid-vapor splitter fluidly coupled to the expansion valve; and returning the liquid phase from the liquid-vapor splitter into the cryotank, the method further comprises providing the gas phase from the liquid-vapor splitter to the heat exchanger for providing additional cooling duty to the first stream of the liquefied fuel from the pump.

12. The method of claim 11, wherein the liquefied fuel comprises hydrogen.

13. The method of claim 11, wherein the pump comprises one or more submerged liquid pumps disposed inside the cryotank.

14. The method of claim 11, further comprising expanding the first stream of the liquefied fuel from the heat exchanger isentropically through an expander turbine coupled with the heat exchanger and the expansion valve.

15. The method of claim 11, wherein an expansion valve is a Joule-Thomson valve.

16. The method of claim 11, wherein the liquid phase is returned into the cryotank through an interlock chamber fluidly coupled to the cryotank.

17. The method of claim 11, wherein returning the liquid phase into the cryotank comprising spraying the liquid phase into a vapor phase in a headspace of the cryotank in a top-fill process.

18. The method of claim 11, further comprising providing a vapor phase of the liquefied fuel from a headspace of the cryotank to the heat exchanger for providing additional cooling duty to the first stream of the liquefied fuel from the pump.

19. The method of claim 18, further comprising at least one or both of:

providing cooling capacity from a refrigeration unit coupled with the heat exchanger to a facility in need thereof, by using the gas from the heat exchanger; and generating electrical power in a backup power unit by using the gas from the heat exchanger.

20. The method of claim 19, wherein the electrical power is generated through one or more fuel cells in the backup power unit.

21. The method of claim 19, wherein electricity power is provided from the backup power unit to a data center or the pump, and the cooling capacity from the refrigeration unit is used for cooling the data center.

22. The method of claim 11, further comprising providing a second stream of the liquefied fuel from the cryotank to a refueling station comprising a dispenser, and dispensing it in a form of a gaseous fuel or liquid fuel to a receiving fuel tank.

* * * * *